(12) United States Patent
Branca

(10) Patent No.: US 9,496,789 B2
(45) Date of Patent: Nov. 15, 2016

(54) INDEPENDENT OUTPUT CONTROL FOR SINGLE-INDUCTOR, BIPOLAR OUTPUTS, BUCK-BOOST CONVERTERS

(71) Applicant: ST-Ericsson SA, Plan-les-Ouates (CH)

(72) Inventor: Xavier Branca, Grenoble (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/428,027

(22) PCT Filed: Oct. 9, 2013

(86) PCT No.: PCT/EP2013/071023
§ 371 (c)(1),
(2) Date: Mar. 13, 2015

(87) PCT Pub. No.: WO2014/056971
PCT Pub. Date: Apr. 17, 2014

(65) Prior Publication Data
US 2015/0236594 A1    Aug. 20, 2015

Related U.S. Application Data

(60) Provisional application No. 61/727,439, filed on Nov. 16, 2012.

(30) Foreign Application Priority Data

Oct. 12, 2012  (EP) ..................... 12306265

(51) Int. Cl.
*H02M 3/158*  (2006.01)
*G09G 5/18*   (2006.01)
*G09G 3/32*   (2016.01)

(52) U.S. Cl.
CPC ......... *H02M 3/1582* (2013.01); *G09G 3/3258* (2013.01); *G09G 5/18* (2013.01); *Y10T 307/406* (2015.04)

(58) Field of Classification Search
CPC ........ H02M 1/08; H02M 1/10; H02M 1/425; H02M 2001/009
See application file for complete search history.

(56) References Cited

U.S. PATENT DOCUMENTS 5,196,995 A * 3/1993 Gulczynski ........... H02M 3/158
                                                323/224
6,002,603 A * 12/1999 Carver .................. H02M 3/158
                                                363/132

(Continued)

FOREIGN PATENT DOCUMENTS

WO    2012/032176 A1    3/2012

OTHER PUBLICATIONS

International Search Report issued in corresponding International application No. PCT/EP2013/071023, date of mailing of report Nov. 13, 2013.

(Continued)

*Primary Examiner* — Timothy J Dole
*Assistant Examiner* — Yusef Ahmed
(74) *Attorney, Agent, or Firm* — Patent Portfolio Builders PLLC

(57) ABSTRACT

A method of driving a power stage configured to provide both a positive output voltage higher than a first potential to a positive output and a negative output voltage to a negative output includes generating a first control signal and a second control signal, and initiating a charging phase, a first duty cycle of the first control signal controlling an amount of energy to be accumulated. The method further includes initiating a first discharging phase of discharging a second amount of energy the positive output and the negative output, based on a simultaneous monitoring of the first control signal and the second control signal, the amount of energy to be discharged being controlled via a second duty cycle of the second control signal.

22 Claims, 9 Drawing Sheets

(56) References Cited

U.S. PATENT DOCUMENTS

| | | | |
|---|---|---|---|
| 6,522,110 B1* | 2/2003 | Ivanov | G05F 1/577 307/39 |
| 7,952,900 B2* | 5/2011 | Tomiyoshi | H02M 3/1582 363/132 |
| 8,446,133 B2* | 5/2013 | Kuan | H02M 3/1582 323/271 |
| 8,860,387 B2* | 10/2014 | Kobayashi | H02M 3/1582 323/259 |
| 2002/0101745 A1* | 8/2002 | Seki | H02M 1/083 363/65 |
| 2004/0135562 A1* | 7/2004 | Oden | H02M 3/158 323/282 |
| 2004/0201281 A1* | 10/2004 | Ma | H02M 3/158 307/38 |
| 2005/0105227 A1* | 5/2005 | Chen | H02M 3/1588 361/82 |
| 2005/0110471 A1* | 5/2005 | Mayega | H02M 3/156 323/267 |
| 2005/0195626 A1* | 9/2005 | Huang | H02M 1/425 363/132 |
| 2005/0264271 A1* | 12/2005 | Lam | H02M 1/10 323/282 |
| 2007/0262759 A1* | 11/2007 | Burton | H02M 3/1584 323/272 |
| 2008/0055946 A1* | 3/2008 | Lesso | H02M 3/158 363/63 |
| 2008/0297128 A1* | 12/2008 | Xu | H02M 3/156 323/282 |
| 2008/0315850 A1* | 12/2008 | Nishida | H02M 3/157 323/284 |
| 2009/0051333 A1* | 2/2009 | Jo | H03K 17/0406 323/235 |
| 2009/0195267 A1* | 8/2009 | Ho | H03K 17/102 326/68 |
| 2009/0237062 A1* | 9/2009 | Tai | H01L 27/0744 323/311 |
| 2010/0002473 A1* | 1/2010 | Williams | H02M 3/158 363/21.06 |
| 2010/0039080 A1* | 2/2010 | Schoenbauer | H02M 3/1582 323/234 |
| 2010/0039086 A1* | 2/2010 | De Stegge | H02M 3/1582 323/282 |
| 2010/0194359 A1* | 8/2010 | Notman | H02M 3/1588 323/267 |
| 2011/0089915 A1* | 4/2011 | Qiu | H02M 3/156 323/271 |
| 2011/0089917 A1* | 4/2011 | Chen | H02M 3/1584 323/282 |
| 2012/0032644 A1* | 2/2012 | Hagiwara | H01M 10/0525 320/134 |
| 2012/0032664 A1 | 2/2012 | Coleman et al. | |
| 2012/0043947 A1* | 2/2012 | Wilson | H02M 3/1582 323/234 |
| 2012/0139509 A1* | 6/2012 | Hunt | H02M 3/156 323/234 |
| 2012/0235976 A1* | 9/2012 | Van Lier | G09G 3/3466 345/212 |
| 2012/0286576 A1* | 11/2012 | Jing | H02M 3/156 307/43 |
| 2012/0326691 A1* | 12/2012 | Kuan | H02M 3/158 323/299 |
| 2013/0026835 A1* | 1/2013 | Ghosh | H02J 9/062 307/66 |
| 2013/0141070 A1* | 6/2013 | Goessling | H02M 3/156 323/284 |
| 2013/0154591 A1* | 6/2013 | Branca | H02M 3/158 323/271 |
| 2014/0145700 A1* | 5/2014 | Branca | H03K 17/102 323/311 |
| 2014/0218117 A1* | 8/2014 | Branca | H02M 3/156 330/297 |
| 2014/0232359 A1* | 8/2014 | Dash | H02M 3/158 323/235 |
| 2015/0236594 A1* | 8/2015 | Branca | H02M 3/1582 345/213 |

OTHER PUBLICATIONS

Extended European Search Report issued in corresponding European application No. EP 12 30 6265, date of completion of the search Mar. 12, 2013.
Texas Instruments, TPS65136, "A Single Inductor Multiple Output Regulator for AMOLED," http://www.ti.com/lit/ds/symlink/tps65136.pdf (849 KB). Jul. 7, 2008.

* cited by examiner

INDEPENDENT OUTPUT CONTROL FOR SINGLE-INDUCTOR, BIPOLAR OUTPUTS, BUCK-BOOST CONVERTERS

TECHNICAL FIELD

The proposed solution relates generally to Single Inductor Bipolar Output (SIBO) converters, and more especially to a method and an apparatus for controlling operation of such converters.

BACKGROUND ART

Portable devices such as smartphones, tablets, console games or e-book readers, usually utilise multiple supply voltages to power up different internal modules.

Some applications require bipolar power supplies with different regulated voltages, meaning that both positive voltage and negative voltage are needed.

Audio module and display panel are some of examples compliant with the foregoing.

For instance, Active Matrix Organic Light Emitting Diodes (AMOLED) display panel, which is a good candidate for portable devices due to its high display quality (i.e. brightness, contrast, vividness and wide viewing angle) and low power consumption requires the supply of both a positive voltage of 4.6 V and a negative voltage ranging from −1.5 V to −7 V to operate properly.

A power converter such as a Single Inductor Bipolar Output (SIBO) converter may be used to provide such positive and a negative power supply.

A converter is proposed in document (1): TEXAS INSTRUMENTS, TPS65136. Single Inductor Multiple Output Regulator for AMOLED. http://www.ti.com/lit/ds/symlink/tps65136.pdf (849 KB). 7 Jul. 2008.

However, the converter of document (1) is not able to operate properly with stability if the load current asymmetry between the negative output current and the positive output current is greater than 30%, meaning that the difference in current at each output needs to stay in close range.

To summarize, the control of a SIBO-Boost converter adapted to generate required positive output voltage and negative output voltage is not adequately addressed by known techniques.

A possible controller that might be used to solve the above problem is described in document (2) WO2012/032176 wherein it is disclosed a power stage that might be adapted to output a positive output voltage and a negative output voltage. While working satisfactorily, the solution described in document (2) may still be improved to better meet the ever increasing requirements of wireless applications.

SUMMARY OF INVENTION

As the input voltage (i.e. for instance the battery voltage) is most of the time lower than 4.5 V, it can be considered that the positive output voltage would, most of the time, be higher than the input voltage.

Thus, only a Boost-type configuration of the SIBOBB is required for delivering the positive output voltage and Buck-Boost-type configuration of the SIBOBB is required for delivering the negative output voltage.

A first aspect of the proposed solution relates to a method of driving a Single Inductor Bipolar Output Buck-Boost, SIBOBB, clocked by a clock signal having a given clock cycle period, the SIBOBB comprising an input for receiving a first potential, at least four power switches, and at least one positive output adapted to output a positive output voltage substantially higher than the first potential and at least one negative output adapted to output a negative output voltage. The method comprising the following steps performed during the clock cycle period: generating a first control signal based on, at least, the positive output voltage and a positive reference voltage; generating a second control signal based on, at least, the negative output voltage and a negative reference voltage; initiating a charging phase of charging the SIBOBB, based on a monitoring of the first control signal, during which an amount of energy to be accumulated by the SIBOBB is controlled by a first duty cycle of the first control signal; initiating a first discharging phase of discharging the energy accumulated in the SIBOBB to at least one of the positive output in a boost-type configuration of the SIBOBB and the negative output in a buck-type or boost-type configuration of the SIBOBB, based on a simultaneous monitoring of the first control signal and the second control signal, during which first discharging phase, an amount of energy to be discharged by the SIBOBB is controlled by a second duty cycle of the second control signal; and, wherein, the charging phase is initiated before the first discharging phase.

A second aspect relates to an apparatus for driving a Single Inductor Bipolar Output Buck-Boost, SIBOBB, clocked by a clock signal having a given clock cycle period, the SIBOBB comprising an input for receiving a first potential and at least four power switches and at least one positive output adapted to output a positive output voltage substantially higher than the first potential and at least one negative output adapted to output a negative output voltage, the apparatus comprising:

means for generating a first control signal configured to be based on, at least, the negative output voltage and a negative reference voltage;

means for generating a second control signal configured to be based on, at least, the positive output voltage and a positive reference voltage;

means for initiating a charging phase of the SIBOBB, configured to be based on a monitoring of the first control signal, during which an amount of energy to be accumulated by the SIBOBB is controlled by a first duty cycle of the first control signal;

means for initiating a first discharging phase of discharging the energy accumulated in the SIBOBB to at least one of the positive output in a boost-type configuration of the SIBOBB and the negative output in a buck-type or boost-type configuration of the SIBOBB, configured to be based on a simultaneous monitoring of the first control signal and the second control signal, during which first discharging phase, an amount of energy to be discharged by the SIBOBB is controlled by a second duty cycle of the second control signal; and, wherein, means for initiating the charging phase are activated before the activation of means for initiating the first discharging phase.

A third aspect relates to a display integrated circuit comprising:

a display panel;
a Single Inductor Bipolar Output Buck-Boost converter (SIBOBB);
a processor; and,
an apparatus as defined in the second aspect of the proposed solution, wherein the display panel and the apparatus are controlled by the processor, the display panel is powered by the SIBOBB and the SIBOBB is controlled by the apparatus.

A fourth aspect relates to wireless device comprising the display integrated circuit as defined in third aspect of the proposed solution.

Examples of such wireless devices comprising AMOLED display panels include, for instance, portable phones, smartphones, tablets, console games, e-book readers, portable audio and/or video players, etc.

Thus in a wireless device embodying the principles of such mechanism, weaknesses of prior art regarding SIBOBB regulation in order to enable independent boost-type conversion for the positive output and buck-type or boost-type conversion for the negative output during a clock cycle are overcome.

Also, with the proposed solution, full load current asymmetry between the negative output current and the positive output current may be supported with a single charge of the inductor of the SIBOBB.

In other words, embodiments offer proper solutions for cases as presented in the introduction.

In one embodiment, generating the first control signal is further based on the negative output voltage and generating the second control signal is further based on the positive output voltage.

In another embodiment, there is further provided the generating a third control signal based on, at least, the first control signal and the second control signal; initiating a second discharging phase of discharging the energy accumulated in the SIBOBB to the positive output in a boost-type configuration of the SIBOBB and to the negative output in a buck-type or boost-type configuration of the SIBOBB simultaneously, based on a monitoring of the first control signal, the second control signal and the third control signal simultaneously, during which second discharging phase, an amount of energy to be discharged by the SIBOBB is controlled by a second duty cycle of the second control signal and a third duty cycle of the third control signal; and, wherein, the charging phase is initiated before the second discharging phase.

In one other embodiment, the first discharging phase comprises discharging the accumulated energy in both the positive output and the negative output sequentially, the discharging of the accumulated energy to the positive output being initiated before the discharging of the accumulated energy to the negative output.

In yet another embodiment, the first discharging phase comprises discharging the accumulated energy in both the positive output and the negative output sequentially, the discharging of the accumulated energy to the positive output being initiated after the discharging of the accumulated energy to the positive output.

In still another embodiment, wherein the second discharging phase comprises discharging the accumulated energy in both the positive output and the negative output simultaneously, and wherein initiating the second discharging phase is performed before the first discharging phase.

In yet another embodiment, the second discharging phase comprises discharging the accumulated energy in both the positive output and the negative output simultaneously, and wherein initiating the second discharging phase is performed after the first discharging phase.

If desired, the first, second and third control signals are generated by a Pulse Width Modulation, PWM, modulator based on respective comparison signals, wherein at least some of the comparison signals are saw-tooth signals or triangular signals.

In one embodiment, generating the first control signal is performed by inputting into the PWM modulator, the first comparison signal and a first error signal proportional to the voltage difference between the positive output voltage and the positive reference voltage.

In another embodiment, generating the second control signal is performed by inputting into the PWM modulator, the second comparison signal and a second error signal proportional to the voltage difference between the negative output voltage and the negative reference voltage.

In yet another embodiment, generating the first control signal is performed by inputting into the PWM modulator, the first comparison signal and a first error signal corresponding to a voltage difference between a sum reference voltage and a voltage sum of positive output voltage and negative output voltage.

In still another embodiment, generating the second control signal is performed by inputting into the PWM modulator, the second comparison signal and a second error signal corresponding to a voltage difference between a difference reference voltage and a voltage difference between positive output voltage and the negative output voltage.

In yet another embodiment, generating the third control signal is performed by inputting into the PWM modulator, a third error signal corresponding to a voltage difference between the first error signal and the second error signal.

BRIEF DESCRIPTION OF DRAWINGS

A more complete understanding of the proposed solution may be obtained from a consideration of the following description in conjunction with the drawings, in which like reference numbers indicate the same or similar element, in FIG. 1 and FIGS. 6 to 14 in a first place and in FIGS. 2 to 5 in a second place and in which.

DESCRIPTION OF EMBODIMENTS

Figure 1:
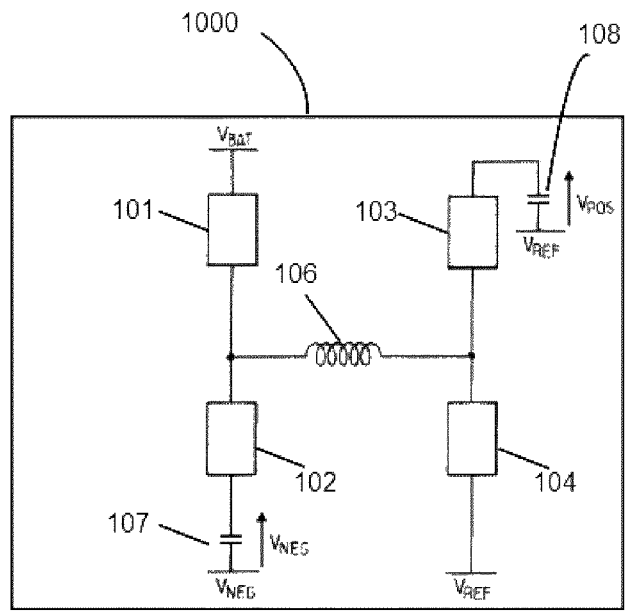
FIG. 1 is a block diagram illustrating an embodiment of a SIBO-Boost converter.

FIG. 1 is a block diagram illustrating an embodiment of a SIBOBB 1000, wherein SIBOBB 1000 is clocked by a clock signal (not shown) having a clock cycle period and comprising four power switches 101, 102, 103, 104, one power inductor 106 and two capacitors 107, 108.

SIBOBB 1000 is adapted to supply a positive output voltage $V_{POS}$ and a negative output voltage $V_{NEG}$ from an input voltage $V_{BAT}$.

$V_{REF}$ corresponds to a reference potential common to the entire SIBOBB 1000, commonly referred to as the ground with a value generally equal to 0 volts.

A possible embodiment of SIBOBB 1000 is described, for instance, as a power stage in document (2) WO2012/032176.

For the sake of clarity and completeness, it appears necessary to present the structure of the power stage of document (2) WO2012/032176 since essential elements therein might be manipulated to achieve the above objectives.

Figure 4:
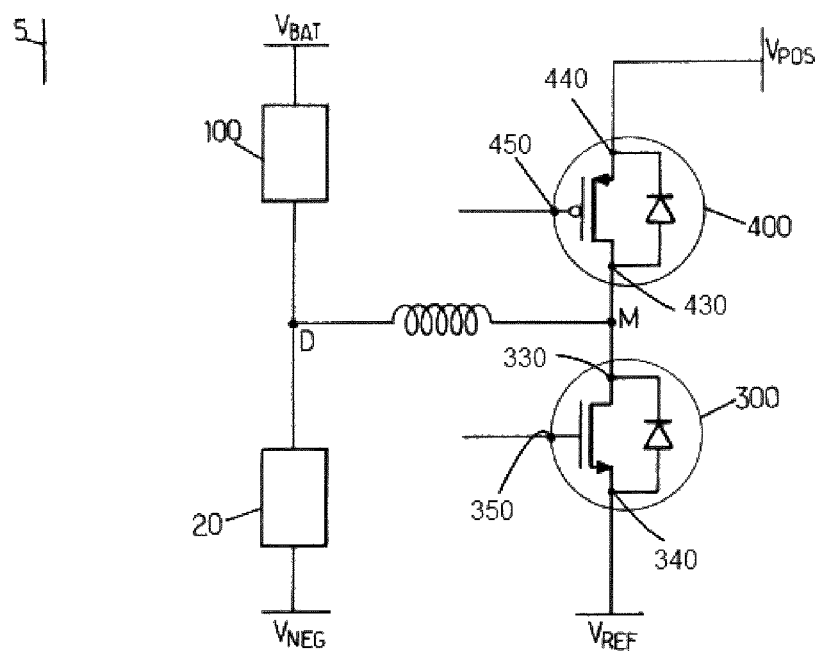
FIG. 4 is a block diagram of an electrical circuit of a power stage according to one embodiment.
Figure 5:
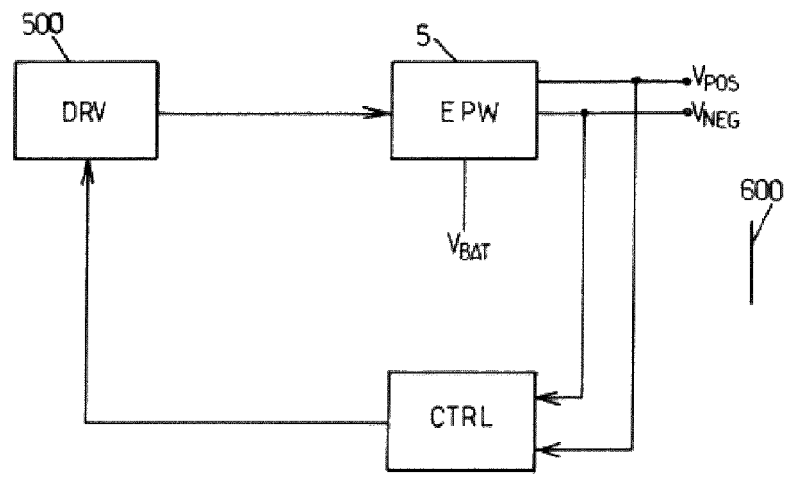
FIG. 5 is a schematic diagram of a power supply according to one embodiment.
Figure 6:
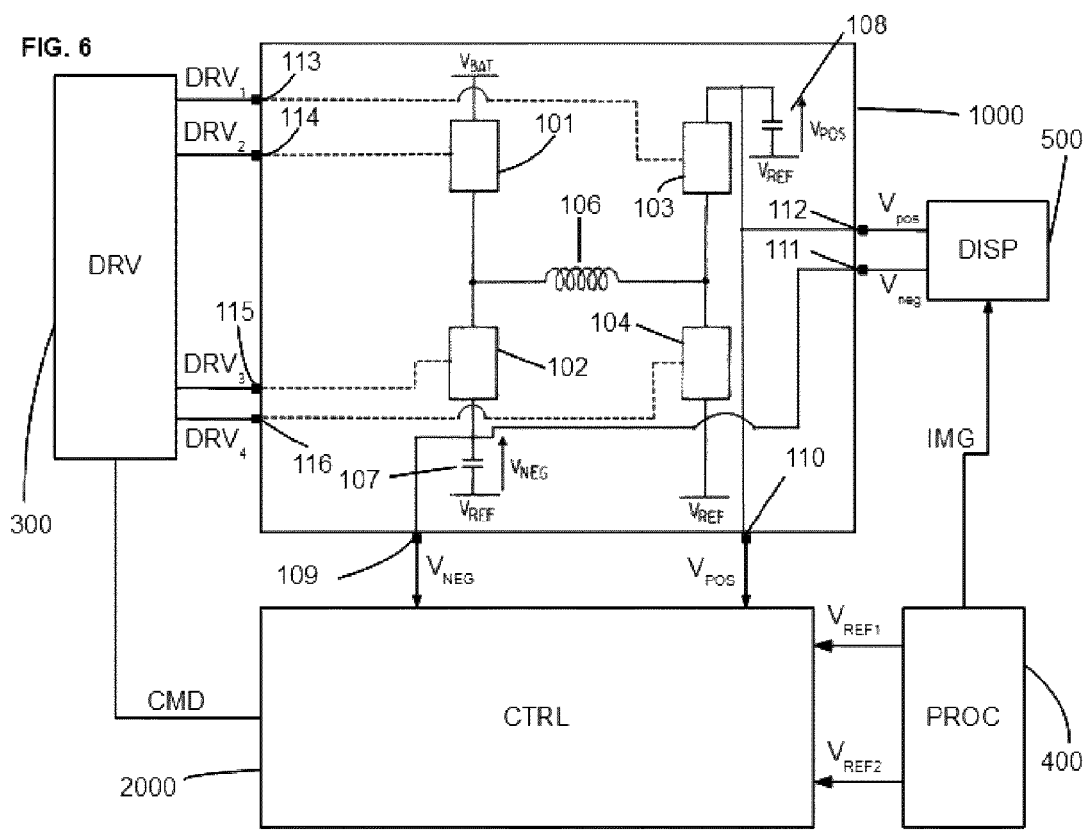
FIG. 6 is a block diagram illustrating an embodiment of the proposed solution.

Therefore, FIGS. 2 to 5 will be used to describe such power stage, and then, starting from the description of FIG. 6, the proposed solution to the above problem will be presented.

Figure 2:
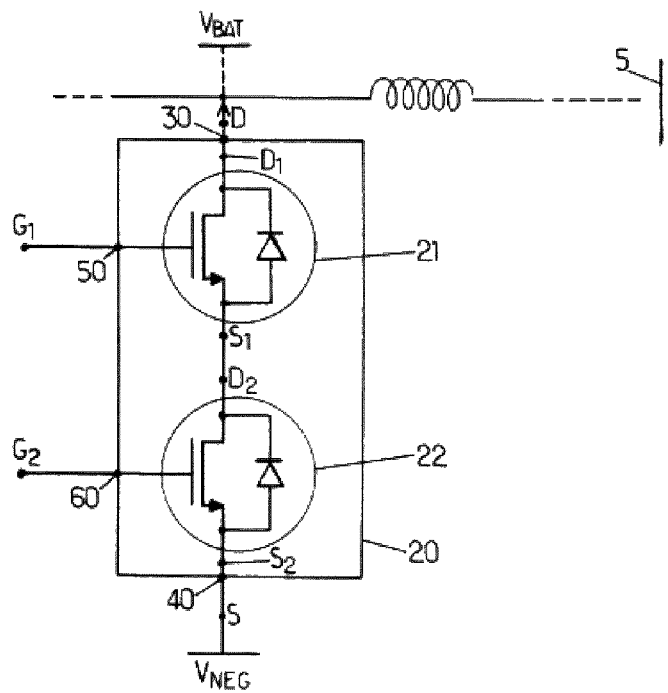
FIG. 2 is a schematic diagram representing a controlled switch according to one embodiment, included in a section of an electrical circuit of a power stage.

One embodiment of a controlled switch 20, included in a section of an electrical circuit 5 of FIG. 4 of a power stage, is diagrammatically represented in FIG. 2. The switch 20 comprises a first coupling node 30 and a second coupling node 40. The switch 20 also comprises at least a first control input 50 and a second control input 60. The switch 20 is adapted to open or close an electrical circuit between the first coupling node 30 and the second coupling node 40, as a function of the control voltages received on the first input 50 and the second input 60. In the example in FIG. 2, the first coupling point 30 is coupled to a node D of the circuit 5, and the second coupling point 40 to a node S of the circuit 5. The voltage at the node S is equal to a voltage $V_{NEG}$.

The switch 20 comprises cascode connected first transistor 21 and second transistor 22. The first and second transistors 21 and 22 may be metal-oxide-semiconductor (MOS) transistors, each comprising a gate, a drain, and a source. In the example in FIG. 2, the first and second transistors are N-channel MOS transistors, more commonly referred to as NMOS transistors.

The first transistor 21 is conducting, meaning that it allows current to pass between its drain and its source, when the difference in potential $V_{GS}$ between its gate and its source is greater than a first threshold $V_{TH1}$. Otherwise, meaning if $V_{GS} < V_{TH1}$, the first transistor 21 is blocked, that is to say non-conducting. The second transistor 22 is conducting, meaning that it allows current to pass between its drain and its source, when the difference in potential $V_{GS}$ between its gate and its source is greater than a second threshold $V_{TH2}$. Otherwise, meaning if $V_{GS} < V_{TH2}$, the second transistor 22 is non-conducting.

The first transistor 21 is placed in the switch 20 so that its gate is coupled to the first input 50, its drain is coupled to the first coupling node 30, and its source is coupled to the drain of the second transistor 22. The second transistor 22 is placed in the switch 20 so that its gate is coupled to the second input 60, its drain to the source of the first transistor 21, and its source to the second coupling node 40.

The switch 20 is adapted to be controlled by a first control voltage $T_1$ received on the first input 50, and by a second control voltage $T_2$ received on the second input 60. The value $V_1$ of the first control voltage $T_1$ is less than that of the voltage $V_{BAT}$ and greater than that of the voltage $V_{NEG}$. The value $V_1$ of the first control voltage $T_1$ is substantially constant.

The second control voltage $T_2$ can substantially assume two values:
 a first value $V_{21}$ which is substantially equal to the value $V_1$ of the first control voltage $T_1$
 a second value $V_{22}$ which is less than the value $V_1$ of the first control voltage $T_1$ and equal to that of the voltage $V_{NEG}$.

The second transistor 22 is configured in the circuit so as to be:
 conducting when the second control voltage has a value substantially equal to the first value $V_{21}$; and,
 non-conducting when the second control voltage has a value substantially equal to the second value $V_{22}$.

To close the switch 20, and therefore allow current to flow between the first and second coupling nodes, the control voltage T2 is applied to the second input 60 while ensuring that the value of said control voltage is equal to the value $V_{21}$. The difference in potential $V_{GS}$ between the gate and the source of the second transistor 22 is then equal to the difference between the value $V_1$ and the value of the voltage $V_{NEG}$, and this difference in potential $V_{GS}$ is greater than the threshold $V_{TH2}$. Conversely, in order to open the switch 20 and therefore prevent current from flowing between the first and second coupling nodes, the control voltage $T_2$ is applied to the second input 60 while ensuring that the value of said control voltage is equal to the value $V_{22}$. Whether the switch 20 is closed or open, the value of the first control voltage $T_1$ is maintained at the value $V_1$. The difference in potential $V_{GS}$ between the gate and the source of the second transistor 22 is then substantially zero and less than the threshold $V_{TH2}$.

In one embodiment, the circuit 5 is used to supply a positive voltage $V_{POS}$ and a negative voltage $V_{NEG}$, from the voltage $V_{BAT}$. The switch 20 is then coupled to the circuit so that the first input 50 receives the reference voltage $V_{REF}$, and the second input 60 receives either the reference voltage $V_{REF}$ or the negative voltage $V_{NEG}$, depending on whether the switch is to be closed or open.

As a non-limiting example, the voltage $V_{BAT}$ is supplied by a battery, at a value substantially equal to 4.8V. The positive voltage $V_{POS}$ and the negative voltage $V_{NEG}$ can be symmetrical voltages or dissymmetrical voltages possibly comprised in a range of [1.5V; 4.8V] and [−1.5V; −4.8V] respectively. The values $V_1$ and $V_{21}$ are equal to the reference voltage $V_{REF}$, which is 0V. The value $V_{22}$ is equal to the negative voltage $V_{NEG}$, which is possibly comprised in the range [−1.5V; −4.8V]. When the switch 20 is open, the difference in potential between the first and second coupling nodes is therefore substantially equal to 9.6V. The voltage $V_{GS}$ between the gate and the source of the first transistor 21 is then zero, because the current between the first and second coupling nodes is zero. As a result, the voltage at the drain of the second transistor 22 is equal to $V_1$, which is 0V. The first and second transistors can therefore be designed and manufactured to support a maximum difference in potential of only 4.8V.

Figure 3:
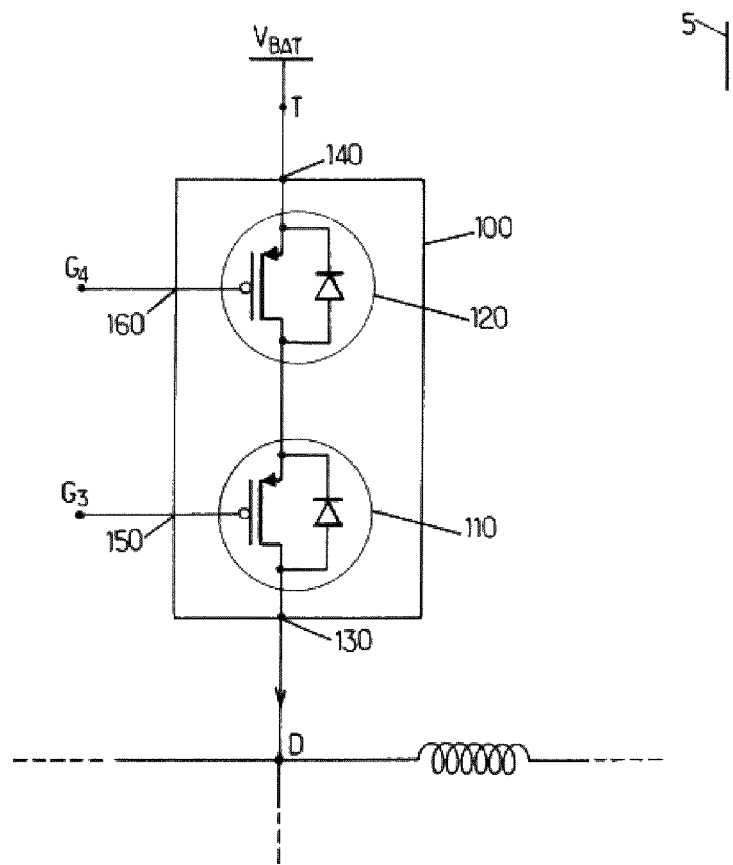
FIG. 3 is a schematic diagram representing a controlled switch according to another embodiment, included in another section of the electrical circuit.

A controlled switch 100 according to another embodiment, and which may be included in a section of the electrical circuit 5, is represented in FIG. 3. The switch 100 comprises a first coupling node 130 and a second coupling node 140. The switch 100 also comprises at least a first control input 150 and a second control input 160. The switch 100 is adapted to open or close an electrical circuit between the first coupling node 130 and the second coupling node 140, as a function of the control voltages received in particular on the first input 150 and the second input 160. In the example in FIG. 3, the first coupling point 130 is coupled to the node D, and the second coupling point 140 to the node T. The voltage at the node T is equal to the voltage $V_{BAT}$.

The switch 100 as shown comprises cascode connected first transistor 110 and a second transistor 120. The first and second transistors are typically metal-oxide-semiconductor transistors, more commonly referred to as MOS transistors, each comprising a gate, a drain, and a source. More particularly, in the example in FIG. 3, the first and second transistors are P-channel MOS transistors or PMOS transistors.

The first transistor 110 is conducting, meaning that it allows current to pass between its drain and its source, when the difference in potential $V_{GS}$ between its gate and its source is less than a threshold $V_{TH3}$. Otherwise, meaning if $V_{GS} > V_{TH3}$, the first transistor 110 is non-conducting. The second transistor 120 is conducting, meaning it allows current to pass between its drain and its source, when the difference in potential $V_{GS}$ between its gate and its source is less than a threshold $V_{TH4}$. Otherwise, meaning if $V_{GS} > V_{TH4}$, the second transistor 120 is non-conducting.

The first transistor 110 is placed in the switch 100 so that its gate is coupled to the first input 150, its drain to the first coupling node 130, and its source to the drain of the second transistor 120. The second transistor 120 is placed in the switch 100 so that its gate is coupled to the second input 160, its drain to the source of the first transistor 110, and its source to the second coupling node 140.

The switch 100 is adapted to be controlled by a first control voltage $T_3$ received on the first input 150, and by a second control voltage $T_4$ received on the second input 160. The value $V_3$ of the first control voltage $T_3$ is less than that of the voltage $V_{BAT}$ and greater than that of the voltage $V_{NEG}$. The value $V_3$ of the first control voltage $T_3$ is substantially constant.

The second control voltage $T_4$ can substantially assume two values:
  a first value $V_{41}$ which is substantially equal to the value $V_3$ of the first control voltage $T_3$,
  a second value $V_{42}$ which is greater than the value $V_3$ of the first control voltage $T_3$ and equal to that of the voltage $V_{BAT}$.

The second transistor 120 is configured in the circuit to be:
  conducting when the second control voltage has a value substantially equal to the first value $V_{41}$,
  non-conducting when the second control voltage has a value substantially equal to the second value $V_{42}$.

Thus, to close the switch 100 and therefore allow current to flow between the first and second coupling nodes, it is sufficient to apply the control voltage $T_4$ to the second input 160 while ensuring that the value of said control voltage is equal to the value $V_{41}$. The difference in potential $V_{GS}$ between the gate and the source of the second transistor is then equal to the difference between the value $V_3$ and the voltage $V_{BAT}$, and this difference in potential $V_{GS}$ is less than the threshold $V_{TH4}$. Otherwise, to open the switch 100 and therefore prevent current from flowing between the first and the second coupling node, the control voltage $T_4$ is applied to the second input 160 while ensuring that the value of said control voltage is equal to the value $V_{42}$. The difference in potential $V_{GS}$ between the gate and the source of the second transistor is then substantially zero and greater than the threshold $V_{TH4}$. Whether the switch 20 is open or closed, the value of the first control voltage $T_3$ is maintained at the value $V_{41}$.

In one embodiment, the circuit 5 is used to supply the positive voltage $V_{POS}$ and the negative voltage $V_{NEG}$, from the voltage $V_{BAT}$. The switch 100 is then coupled to the circuit so that the first input 150 is coupled to the reference potential of the circuit 45, and the second input 160 is coupled either to the voltage $V_{BAT}$ or to the reference potential of the circuit 5, depending on whether the switch is to be closed or open.

As a non-limiting example, the voltage $V_{BAT}$ is for example supplied by a battery, and has a value substantially equal to 4.8V. The values $V_3$ and $V_{41}$ are equal to that of the reference potential, which is 0V. The value $V_{42}$ is equal to that of the voltage $V_{BAT}$, which is 4.8V. The maximum potential difference between the first and the second coupling node is therefore substantially equal to 4.8V. When the switch 100 is open, the voltage $V_{GS}$ between the gate and the source of the first transistor is also zero, because the current between the first and second coupling node is zero. As a result, the value of the voltage at the drain of the second transistor 120 is equal to the value $V_3$, which is 0V. The first and second transistor can therefore be manufactured to support a maximum potential difference of only 4.8V, when the node D is at the negative voltage $V_{NEG}$.

The switch 300 is a transistor which is typically a metal-oxide-semiconductor transistor, more commonly referred to as MOS, comprising a gate, a drain, a source, and a body diode. In the example in FIG. 5, the transistor 300 is a N-channel MOS transistor, or NMOS transistor.

The switch 300 is arranged so that its gate is coupled to the first input 350, its drain to the first coupling node 330, its source to the second coupling node 340, and the anode of the body diode to the first coupling node 330.

The switch 300 is adapted to be controlled by a first control voltage $T_7$ received on the first input 350. To open the switch 300, so that no current can flow, the value $V_7$ of the first control voltage $T_7$ is equal to that of the reference voltage $V_{REF}$. To close the switch 300, so that current can flow, the value $V_7$ of the first control voltage $T_7$ is equal to that of the input voltage $V_{BAT}$.

The switch 400 is a transistor which is typically a metal-oxide-semiconductor transistor, more commonly referred to as MOS, comprising a gate, a drain, a source, and a body diode. In the example in FIG. 5, the transistor 400 is a P-channel MOS transistor, or PMOS transistor.

The switch 400 is arranged so that its gate is coupled to the first input 450, its drain to the first coupling node 430, its source to the second coupling node 440, and the cathode of the body diode to the first coupling node 430.

The switch 400 is adapted to be controlled by a first control voltage $T_8$ received on the first input 450. To open the switch 400, so that no current can flow, the value $V_8$ of the first control voltage $T_8$ is equal to that of the voltage $V_{BAT}$. To close the switch 400, so that current can flow, the value $V_8$ of the first control voltage $T_8$ is equal to that of the reference voltage $V_{REF}$.

The circuit 5 comprising the previously described switches 20 and 100 can in particular be used in a power supply 600, as represented in FIGS. 4 and 5. The power supply 600 is, for example, a voltage regulating device coupled to a voltage source supplying a voltage $V_{BAT}$, for example a storage cell such as a battery. The power supply 600 is, for example, contained in a portable device such as a mobile telephone, a portable audio and/or video player, or a laptop computer. The power supply 600 comprises a power stage implemented by the circuit 5, adapted to supply a positive voltage $V_{POS}$ and a negative voltage $V_{NEG}$. The power stage is equipped with control inputs for receiving control voltages defining a control strategy for producing the negative voltage $V_{NEG}$ and the positive voltage $V_{POS}$. The power supply comprises a control circuit coupled to the power stage outputs in order to compare over time the negative $V_{NEG}$ and positive $V_{POS}$ voltages to at least one reference voltage $V_{REF}$ and to produce error signals $V_{err1}$, $V_{err2}$ The power supply comprises a driving circuit 500 coupled to the control circuit in order to receive the error signals $V_{err1}$, $V_{err2}$ and to generate the control voltages, and to the power stage in order to supply the control voltages so generated.

FIG. 6 is a block diagram illustrating an embodiment of the proposed solution comprising the SIBOBB 1000, a controller (CTRL) 200, a driver (DRV) 3000, a processor (PROC) 4000, and a display module (DISP) 500 wherein DISP 500 and DRV 3000 are controlled by PROC 4000, DISP 500 is powered by SIBOBB 1000 and SIBOBB 1000 is controlled by DRV 3000.

All foregoing elements might be embodied, for instance, in a portable device such as a smartphone, a tablet, a console game or an e-book reader.

Referring to FIG. 6, the SIBOBB 1000 comprises four output pins 109, 110, 111, 112 and four input pins 113, 114, 115, 116.

Input pins 113, 114, 115 and 116 are adapted to receive driving commands $DRV_2$, $DRV_3$, $DRV_1$ and $DRV_4$ from DRV 3000, and used to command power switches 101, 102, 103 and 104, respectively.

DRV 3000 is configured to either turn on or turn off power switches 101, 102, 103 and 104 thanks to driving commands $DRV_2$, $DRV_3$, $DRV_1$ and $DRV_4$, respectively based on one or more control commands CMD received from CTRL 2000.

One should understand that, throughout the description, when a power switch 101, 102, 103 and 104, is said to be "turned on" it means that corresponding switch 101, 102, 103 and 104 is "closed" and conducting, such that current can flow through it.

On the other hand, when a power switch 101, 102, 103 and 104, is said to be "turned off" it means that corresponding switch 101, 102, 103 and 104 is "open" and non-conducting, such that current can not flow through it.

Referring again to FIG. 6, output pins 111 and 112 are adapted to provide positive output voltage $V_{POS}$ substantially higher than the voltage $V_{BAT}$ and negative output voltage $V_{NEG}$ to DISP 500, respectively.

DISP 500 is configured to display one or more images IMG, by supplying pixels (not shown) of DISP 500 with positive output voltage $V_{POS}$ and negative output voltage $V_{NEG}$.

For instance, DISP 500 might be a Liquid Crystal Display (LCD) panel, an Organic Light Emitting Diode (OLED) display panel or an AMOLED display panel.

For instance, as well, the one or more images IMG are presented to DISP 500 by PROC 4000.

Referring again to FIG. 6, output pins 109 and 110 are adapted to provide positive output voltage $V_{POS}$ substantially higher than the voltage $V_{BAT}$ and negative output voltage $V_{NEG}$ to CTRL 2000, respectively.

CTRL 2000 is configured to control operations modes performed by SIBOBB 1000.

An operation mode is a particular task performed by SIBOBB 1000.

For instance, in an embodiment, SIBOBB 1000 can be configured to perform the following tasks:
charging the inductor 106 current,
discharging the inductor 106 current to a negative output 109, 111, or
discharging the inductor 106 current to a positive output 110, 112.

These tasks can be arranged in a particular order depending on the requirements.

In the rest of the description, a series of sequential tasks performed by SIBOBB 1000 would be called a conduction cycle.

A conduction cycle is generally performed during a clock cycle period, whereby a clock cycle period is the time from a first clock signal to the end of a succession of clock signals.

In order to apply particular conduction cycle, CTRL 2000 uses one or more control commands CMD sent to DRV 3000.

Control commands CMD are based on, at least, positive output voltage $V_{POS}$, negative output voltage $V_{NEG}$, a first reference voltage $V_{REF1}$, and a second reference voltage $V_{REF2}$ or a combination of the foregoing parameters.

For instance, the first reference voltage might be a positive reference voltage or a sum reference voltage while the second reference voltage might be a negative reference voltage or a difference reference voltage.

Both, the first reference voltage $V_{REF1}$ and the second reference voltage $V_{REF2}$ are received by CTRL 2000 from PROC 4000.

PROC 4000 is configured to control the provided reference voltage $V_{REF1}$ and reference voltage $V_{REF2}$ to CTRL 2000 and is also configured to present one or more images IMG to DISP 500 so as to have them being displayed by DISP 500.

In order to overcome the weakness of prior art regarding asymmetry in load current between negative output current and positive output current, as stated before, it is proposed, in one embodiment, a conduction cycle made of at least two phases.

Figure 7A:
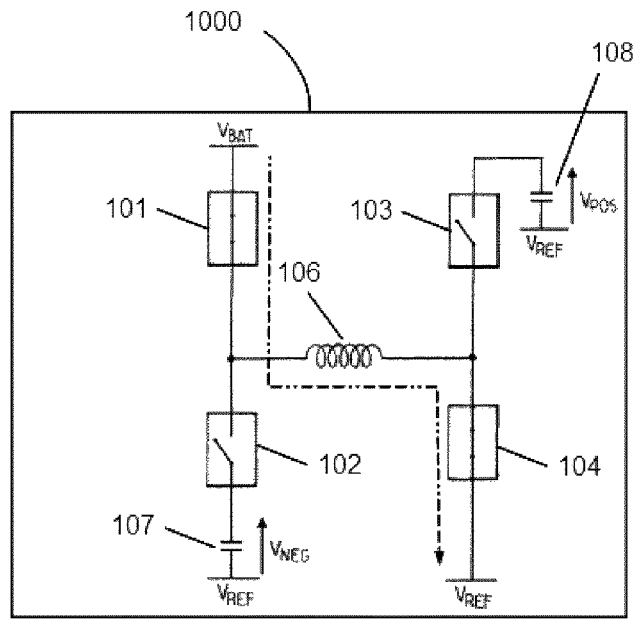
FIG. 7A is a block diagram illustrating an embodiment of a phase of a conduction cycle according to the proposed solution.
Figure 7B:
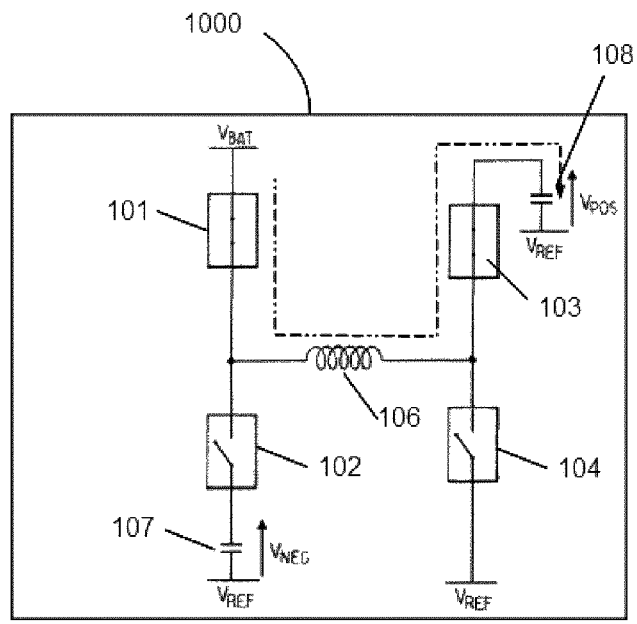
FIG. 7B is a block diagram illustrating an embodiment of another phase of a conduction cycle according to the proposed solution.
Figure 7C:
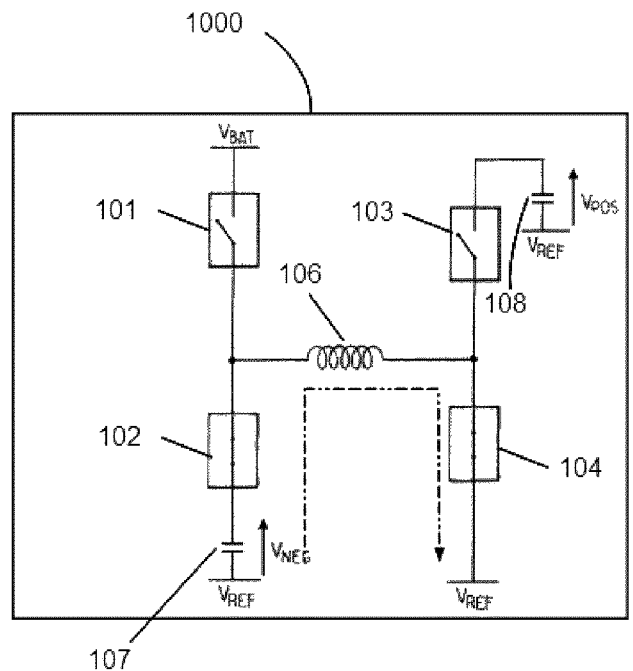
FIG. 7C is a block diagram illustrating an embodiment of yet another phase of a conduction cycle according to the proposed solution.
Figure 7D:
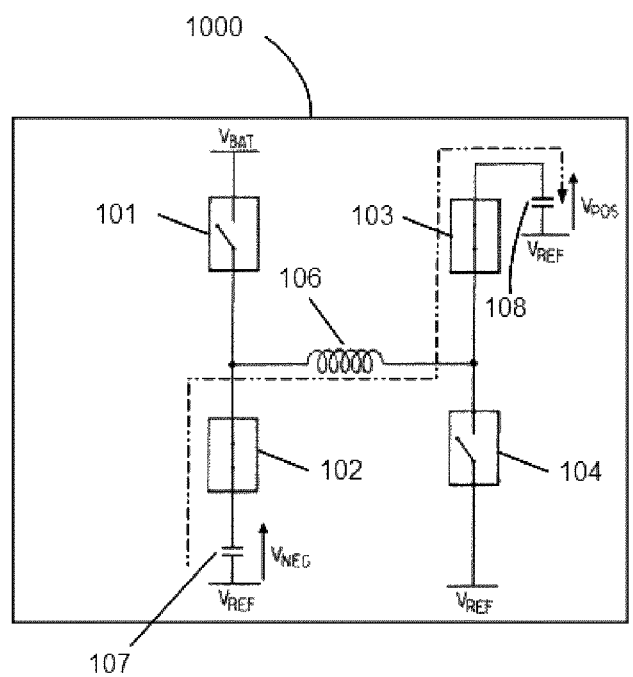
FIG. 7D is a block diagram illustrating an embodiment of still another phase of a conduction cycle according to the proposed solution.

The two phases can be chosen from a group comprising embodiments of FIG. 7A (called thereinafter charging phase or CHG), FIG. 7B (called thereinafter positive discharging phase or $DISCHG_{POS}$), FIG. 7C (called thereinafter negative discharging phase or $DISCHG_{NEG}$) and FIG. 7D (called thereinafter simultaneous discharging phase or $DISCHG_{SIMUL}$).

However, one should note that the first phase of the conduction cycle needs to be set to the embodiment of FIG. 7A CHG.

Therefore, at least eight different variants of the conduction cycle can be implemented, based on particular chaining of the different phases during a clock cycle period.

Namely, the conduction cycle can be arranged in any of the following configurations:
CHG-$DISCHG_{POS}$,
CHG-$DISCHG_{NEG}$,
CHG-$DISCHG_{POS}$-$DISCHG_{NEG}$,
CHG-$DISCHG_{NEG}$-$DISCHG_{POS}$,
CHG-$DISCHG_{SIMUL}$-$DISCHG_{POS}$,
CHG-$DISCHG_{SIMUL}$-$DISCHG_{NEG}$,
CHG-$DISCHG_{POS}$-$DISCHG_{SIMUL}$, and
CHG-$DISCHG_{NEG}$-$DISCHG_{SIMUL}$.

Therefore, one should understand that the discharging phase could be performed to only one output or both outputs.

In an embodiment wherein discharging phase occurs on both outputs, this could be done by discharging in a sequential fashion (i.e. one after the other).

Let's describe, the different phases of FIG. 7A, FIG. 7B, FIG. 7C and FIG. 7D.

Referring to FIG. 7A, FIG. 7B, FIG. 7C and FIG. 7D there is shown therein the SIBOBB 1000 wherein, for instance, power switches 102 and 103 might be implemented as Schottky diodes, if for instance low output power is required out of the SIBOBB 1000.

In fact, Schottky diodes have the main advantage of switching naturally. Therefore its use could permit to make the economy of charging a power MOSFET gate thus reducing the switching loss in the SIBOBB 1000. Furthermore, Schottky diodes have low drop (i.e. few hundred of millivolts) and thus they have not so large ohmic losses.

This choice is also simplifying the conduction cycle, since in this case only two power switches 101 and 104 need to be controlled.

Obviously others type of diodes may be used as well depending on required efficiency and transient responses.

Referring to FIG. 7A, there is shown therein the power switches 102 and 103 which are turned off and the power switches 101 and 104 which are turned on.

With such configuration, SIBOBB 1000 enters the charging phase CHG, wherein the inductor current is charged between $V_{BAT}$ and $V_{REF}$.

Referring to FIG. 7B, there is shown therein the power switches 101 and 103 which are turned on and the power switches 102 and 104 which are turned off.

With such configuration, SIBOBB 1000 enters the positive discharging phase $DISCHG_{POS}$ wherein all or part of the inductor current is discharged to the positive output voltage $V_{POS}$, between $V_{BAT}$ and $V_{POS}$.

In this case, one should understand that this configuration assumes that $V_{POS}$ is substantially higher than the voltage $V_{BAT}$.

This is for instance the case for AMOLED display panels wherein the required positive voltage is 4.6 V while the battery voltage $V_{BAT}$ supplying such screens are most of the time lower than 4.5 V.

Referring to FIG. 7C, there is shown therein the power switches 102 and 104 which are turned on and the power switches 101 and 103 which are turned off.

With such configuration, SIBOBB 1000 enters the negative discharging phase $DISCHG_{NEG}$ wherein all or part of the inductor current is discharged to the negative output voltage $V_{NEG}$, between $V_{NEG}$ and $V_{REF}$.

Referring to FIG. 7D, there is shown therein the power switches 101 and 104 which are turned off and the power switches 102 and 103 which are turned on.

With such configuration, SIBOBB 1000 enters the discharging phase $DISCHG_{SIMUL}$, wherein all or part of the inductor current is discharged simultaneously to both the positive output voltage $V_{POS}$ and the negative output voltage $V_{NEG}$, between $V_{NEG}$ and $V_{POS}$.

Figure 8:
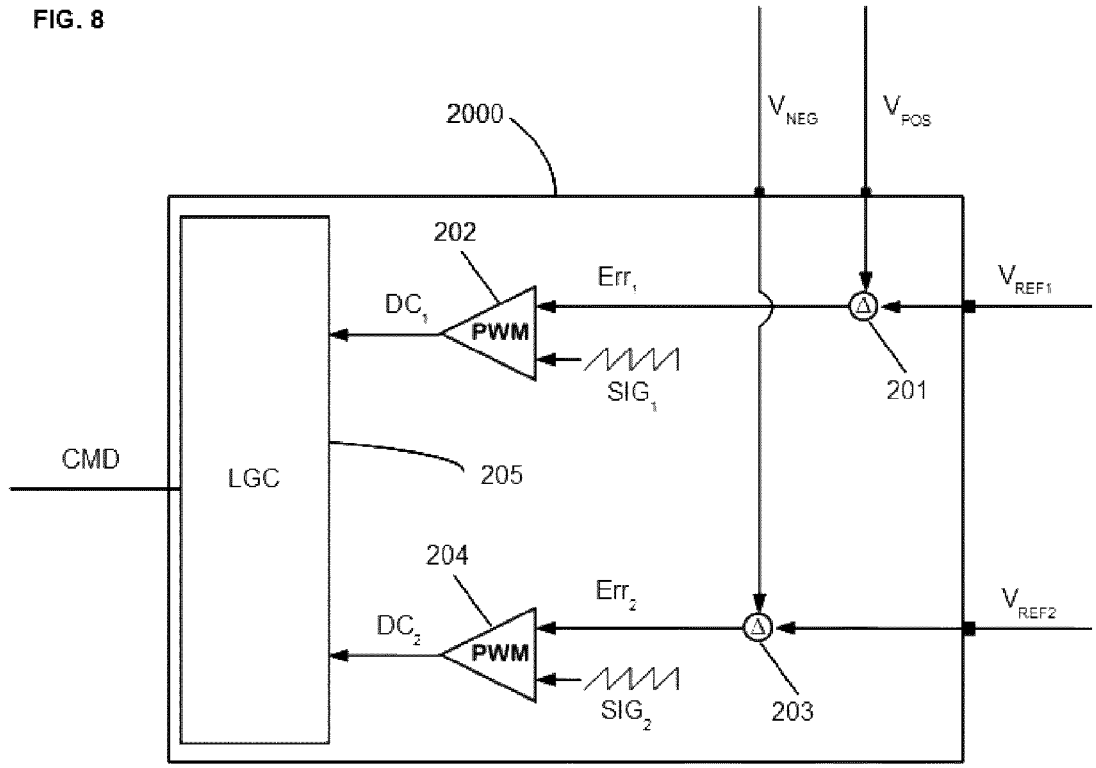
FIG. 8 is a block diagram illustrating an embodiment of a controller according to the proposed solution.

FIG. 8 is a block diagram illustrating an embodiment of CTRL 2000, wherein there is shown therein two difference units 201, 203, two error comparison units 202, 204 and a logic control unit LGC 205.

Referring to FIG. 8, $V_{POS}$ and $V_{REF1}$ are received at the input of the difference unit 201 which is configured to generate an error signal $ERR_1$ from a difference between $V_{POS}$ and $V_{REF1}$.

Also, in FIG. 8, $V_{NEG}$ and $V_{REF2}$ are received at the input of the difference unit 203 which is configured to generate an error signal $ERR_2$ from a difference between $V_{NEG}$ and $V_{REF2}$.

Afterwards, $ERR_1$ is presented at the input of the comparison unit 202 along with a signal $SIG_1$ while $ERR_2$ is presented at the input of the comparison unit 204 along with a signal $SIG_2$.

One should understand that the implementation of comparison unit 202 might be different from the implementation of comparison unit 204, the implementation of the difference unit 201 might be different from the implementation of the difference unit 203 and the implementation of SIG1 might be different from the implementation of $SIG_2$.

In an embodiment, the difference units 201, 203 are error amplifiers with proportional plus integral plus derivative (PID) control, the comparison units 202 and 204 are Pulse Width Modulation (PWM) modulators while signal $SIG_1$ and $SIG_2$ are, for instance, periodic ramp signals, which period equals the clock period such as saw-tooth signals or triangular signals.

With such embodiment, the comparison unit 202 is configured to generate a PWM signal $DC_1$ based on $ERR_1$ and $SIG_1$.

This operation is performed, for instance, by having the PWM modulator 202 setting a logic high state to $DC_1$ when $ERR_1$ is below $SIG_1$ and setting a logic low state to $DC_1$ when $ERR_1$ exceeds $SIG_1$.

Also, with such embodiment, the comparison unit 204 is configured to generate a PWM signal $DC_2$ based on $ERR_2$ and $SIG_2$.

This operation is performed, for instance, by having the PWM modulator 204 setting a logic high state to DC2 when $ERR_2$ is below $SIG_2$ and setting a logic low state to $DC_2$ when $ERR_2$ exceeds $SIG_2$.

In digital logic, logic high state would be a bit 1 and logic low state would be a bit 0 while in analog logic, logic high state would be a high voltage level and logic low state would be a low voltage level.

Finally, $DC_1$ and $DC_2$ are presented at the input of LGC 205 which is configured to generate the one or more control commands CMD used to drive DRV 3000 as already explained in the foregoing, in order to apply a given conduction cycle.

The choice of which configuration of the conduction cycle to be used depends on the different logic within which $DC_1$ and $DC_2$ are decoded, during the clock cycle period.

Additionally, since $DC_1$ and $DC_2$ are based on the positive output voltage $V_{POS}$, and on the negative output voltage $V_{NEG}$, therefore the conduction cycle depends on the positive output voltage $V_{POS}$, and on the negative output voltage $V_{NEG}$.

More generally, in the present application, $DC_1$ is used, alone, by LGC 205 to determine the amount of energy to be accumulated by SIBOBB 1000, namely by the current inductor 106, depending on the required positive output voltage $V_{POS}$, and on the negative output voltage $V_{NEG}$ that need to be delivered by the SIBOBB 1000.

On the other hand, $DC_1$ and $DC_2$ are used all together by LGC 205 to determine the amount of energy to be discharged to each output of SIBOBB 1000.

Figure 9:
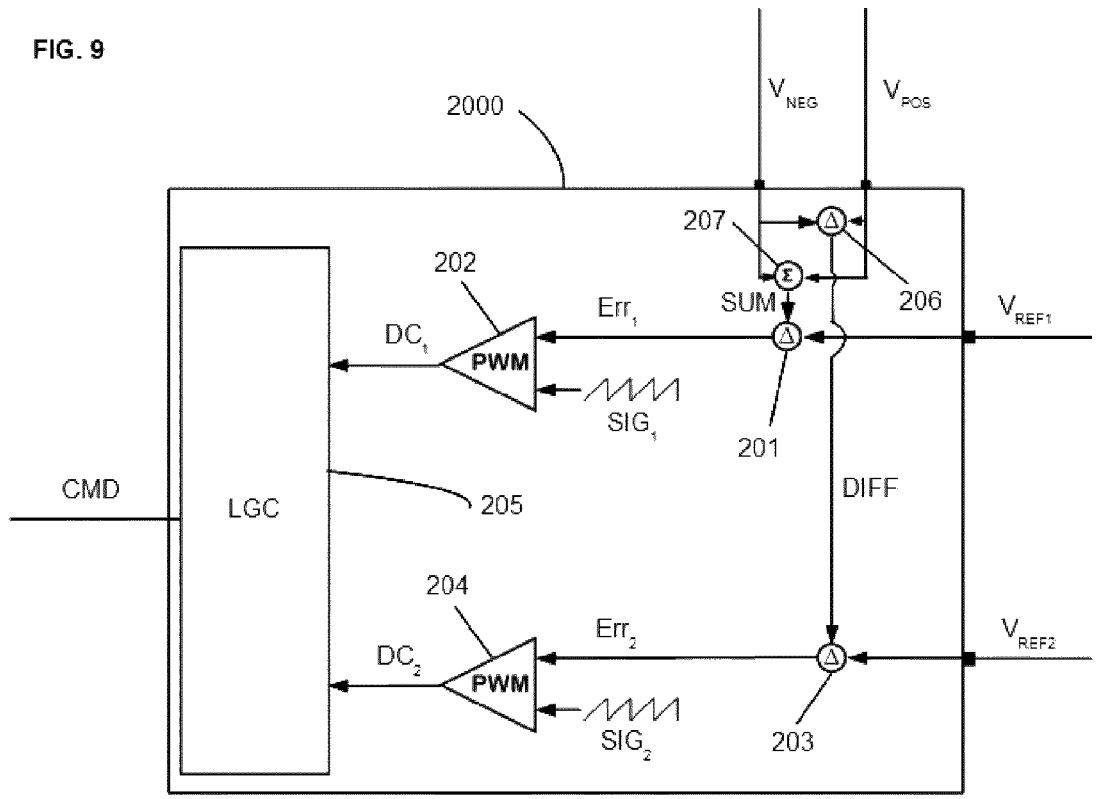
FIG. 9 is a block diagram illustrating another embodiment of a controller according to the proposed solution.

FIG. 9 is a block diagram illustrating an embodiment of CTRL 2000, wherein there is shown therein three difference units 201, 203, 206, one summation unit 207, two error comparison units 202, 204 and a logic control unit (LGC) 205.

Referring to FIG. 9, $V_{POS}$ and $V_{NEG}$ are received at the input of the difference unit 206 which is configured to generate a voltage DIFF from a difference between $V_{POS}$ and $V_{NEG}$.

Again in FIG. 9, $V_{POS}$ and $V_{NEG}$ are received at the input of the summation unit 207 which is configured to generate a voltage SUM from a sum of $V_{POS}$ and $V_{NEG}$.

Later in FIG. 9, SUM and $V_{REF1}$ are received at the input of the difference unit 201 which is configured to generate an error signal $ERR_1$ from a difference between SUM and $V_{REF1}$.

Also, in FIG. 9, DIFF and $V_{REF2}$ are received at the input of the difference unit 203 which is configured to generate an error signal $ERR_2$ from a difference between DIFF and $V_{REF2}$.

Then, $ERR_1$ is presented at the input of the comparison unit 202 along with a signal $SIG_1$ while $ERR_2$ is presented at the input of the comparison unit 204 along with a signal $SIG_2$.

One should understand that each of the implementation of comparison units 202, 204 might be different from each other, each of the implementation of the difference units 201, 203, 206 might be different from each other as well and each of the implementation of $SIG_1$, $SIG_2$ might be different from each other.

In an embodiment, the difference units 201, 203, 206 are error amplifiers with proportional plus integral plus derivative (PID) control, the comparison units 202 and 204 are Pulse Width Modulation (PWM) generators while signal $SIG_1$ and $SIG_2$ are a signal of a saw-tooth signal or a triangular signal.

With such embodiment, the comparison unit 202 is configured to generate a PWM signal $DC_1$ based $ERR_1$ and $SIG_1$.

This operation is performed, for instance, by having the PWM modulator 202 setting a logic high state to $DC_1$ when $ERR_1$ is below $SIG_1$ and setting a logic low state to $DC_1$ when $ERR_1$ exceeds $SIG_1$.

Also, with such embodiment, the comparison unit 204 is configured to generate a PWM signal $DC_2$ based $ERR_2$ and $SIG_2$.

This operation is performed, for instance, by having the PWM modulator 204 setting a logic high state to $DC_2$ when $ERR_2$ is below $SIG_2$ and setting a logic low state to $DC_2$ when $ERR_2$ exceeds $SIG_2$.

In digital logic, logic high state would be a bit 1 and logic low state would be a bit 0 while in analog logic, logic high state would be a high voltage level and logic low state would be a low voltage level.

Finally, $DC_1$ and $DC_2$ are presented at the input of LGC 205 which is configured to generated the one or more control commands CMD used to drive DRV 3000 as already explained in the foregoing, in order to apply a given conduction cycle.

The choice of which configuration of the conduction cycle to be used depends on the different logic within which $DC_1$ and $DC_2$ are decoded, during the clock cycle period.

Additionally, since $DC_1$ and $DC_2$ are based on the positive output voltage $V_{POS}$, and on the negative output voltage $V_{NEG}$, therefore the conduction cycle depends on the positive output voltage $V_{POS}$, and on the negative output voltage $V_{NEG}$.

More generally, in the present application, $DC_1$ is used, alone, by LGC 205 to determine the amount of energy to be accumulated by SIBOBB 1000, namely by the current inductor 106, depending on the required positive output voltage $V_{POS}$, and on the negative output voltage $V_{NEG}$ that need to be delivered by the SIBOBB 1000.

On the other hand, $DC_1$ and $DC_2$ are used all together by LGC 205 to determine the amount of energy to be discharged to each output of SIBOBB 1000.

One should understand, in other words, that the amount of energy to be accumulated or discharged, as explained in the foregoing embodiments of FIG. 8 and FIG. 9, depends on the duty cycle of the corresponding signals $DC_1$ and $DC_2$ wherein the duty cycle should be understood as being the amount of time during which $DC_1$ or $DC_2$ are in a logic high state, during the clock cycle period.

The embodiment of the CTRL 2000 of FIG. 8 is mostly suitable for cases where there is a load current symmetry of negative output current and positive output current that is required at the output 109, 110, 111, 112 of SIBOBB 1000.

In case where a total load current asymmetry of negative output current and positive output current is needed at the output 109, 110, 111, 112 of SIBOBB 1000, embodiment of the CTRL 2000 of FIG. 9 is a possible preferred solution.

Hence, with the configuration of FIG. 9, weakness of state of the art regarding control of SIBO-Boost converters to deliver independent buck or boost to each input voltage is overcome.

In fact, with this embodiment, depending on the duty cycles of $DC_1$ and/or $DC_2$, one output 109, 110, 111, 112 of SIBOBB 1000 may signify that it does not need energy and that only the other output should be supplied. Thus, the conduction cycle could, for instance, comprise two phases corresponding, first to a charging phase followed by a discharging phase to an output 109, 110, 111, 112 of SIBOBB 1000.

Another conduction cycle could, for instance, comprise three phases corresponding, first to a charging phase followed by a discharging phase to an output 109, 110, 111, 112 of SIBOBB 1000 and then another discharging phase to the other output 109, 110, 111, 112 of SIBOBB 1000.

In this case, positive discharging phase $DISCHG_{POS}$ could be performed before negative discharging phase or $DISCHG_{NEG}$ or conversely, negative discharging phase $DISCHG_{NEG}$ could be performed before positive discharging phase or $DISCHG_{POS}$.

Figure 10:
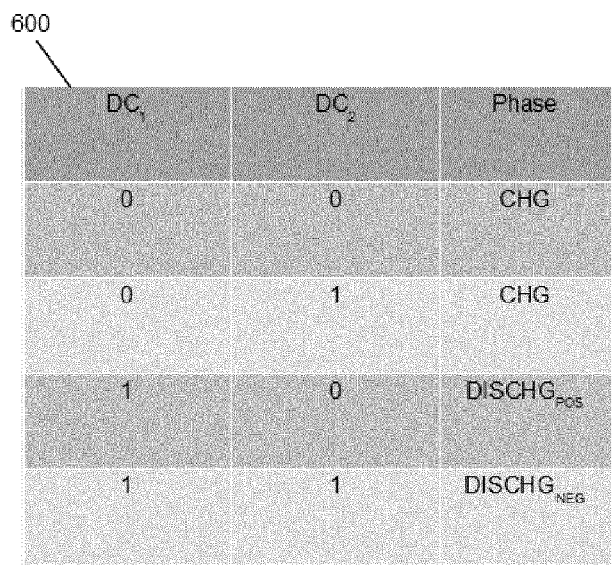
FIG. 10 is a table illustrating a truth table of a conduction cycle according to the proposed solution.

The different logic state combinations of the conduction cycle can be summarised by the exemplary truth table 600 of FIG. 10, wherein digital logic is used.

Possibly, truth table 600 is implemented within LGC 205.

As it can been seen, when $DC_1$ is at a logic state corresponding to bit 0 (i.e. when $ERR_1$ exceeds $SIG_1$) and whatever the logic state of $DC_2$, then SIBOBB 1000 would be instructed by CTRL 2000, through DRV 300, to initiate the charging phase CHG.

This is why it has been stated above that $DC_1$, alone, might be used to determine the amount of energy to be accumulated by SIBOBB 1000.

However, when $DC_1$ is at a logic state corresponding to bit 1 (i.e. when $ERR_1$ is below $SIG_1$) and $DC_2$ is at a logic state corresponding to bit 0 (i.e. when $ERR_2$ exceeds $SIG_2$) then SIBOBB 1000 would be instructed by CTRL 2000, through DRV 300, to initiate the discharging phase $DISCHG_{POS}$.

This is why it has been stated above that $DC_1$ and $DC_2$ are used to determine the amount of energy to be discharged to each output of SIBOBB 1000. As stated earlier, the amount of discharged energy to each output mainly depends on the duty cycle of $DC_1$ and $DC_2$.

Also, when $DC_1$ is at a logic state corresponding to bit 1 (i.e. when $ERR_1$ is below $SIG_1$) and $DC_2$ is at a logic state corresponding to bit 1 (i.e. when $ERR_2$ is below $SIG_2$) then SIBOBB 1000 would be instructed by CTRL 2000, through DRV 300, to initiate the discharging phase $DISCHG_{NEG}$.

This is why it has been stated above that $DC_1$ and $DC_2$ are used to determine the amount of energy to be discharged to each output of SIBOBB 1000.

Again, as stated earlier, the amount of discharged energy to each output 109, 110, 111, 112 of SIBOBB 1000, mainly depends on the duty cycle of $DC_1$ and $DC_2$.

In order to fully understand the proposed solution, two exemplary embodiments of the proposed conduction cycle will be described in FIG. 11 and FIG. 12.

Figure 11:
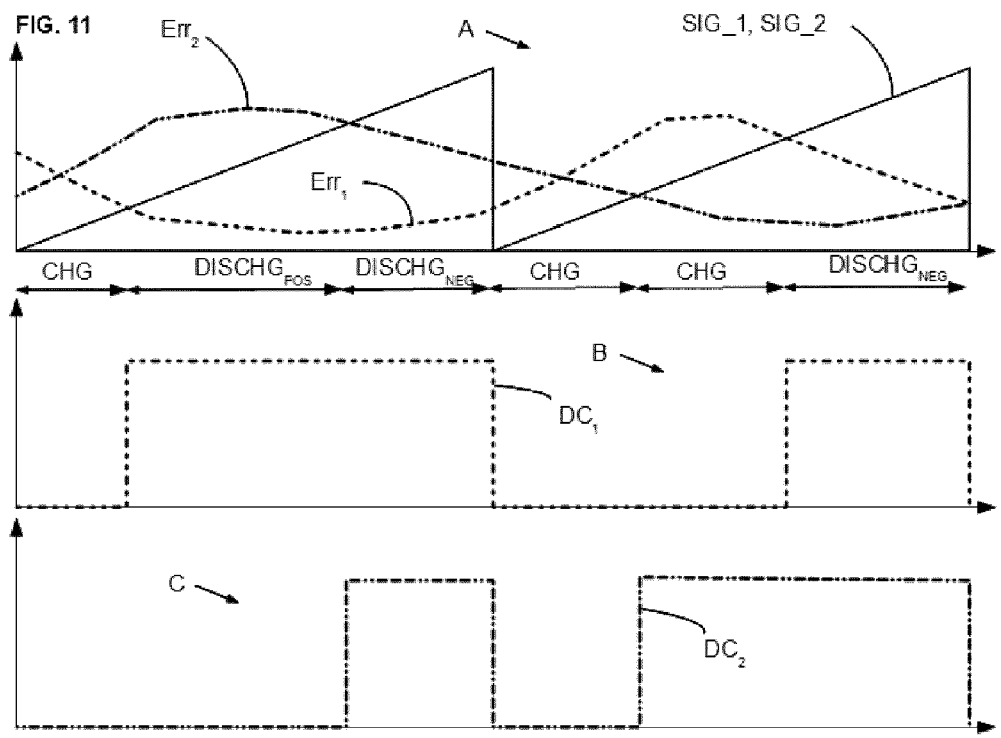
FIG. 11 is a diagram illustrating an embodiment a conduction cycle according to the proposed solution.
Figure 12:
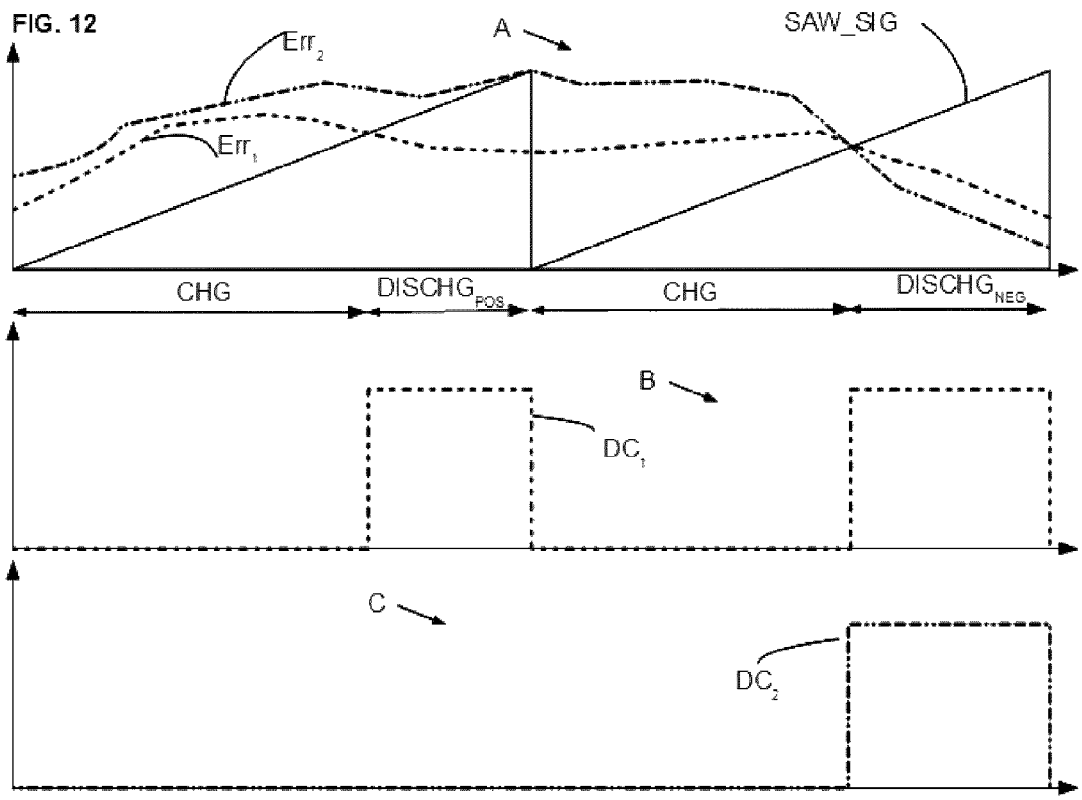
FIG. 12 is a diagram illustrating another embodiment a conduction cycle according to the proposed solution.

Referring to FIG. 11 and FIG. 12, there is shown therein three timing diagrams A, B, C represented over two clock cycle periods.

Timing diagram A shows the evolution of $ERR_1$, $ERR_2$, $SIG_1$ and $SIG_2$.

For the purpose of clarity and simplicity, $SIG_1$ and $SIG_2$ are considered alike and future references would be made to $SIG_1$ only as being a saw-tooth signal.

Timing diagrams B and C show the evolution of $DC_1$ and $DC_2$, respectively.

Referring to FIG. 11, in the first clock cycle period, it can be seen that during CHG phase, both $ERR_1$ and $ERR_2$ exceed $SIG_1$ thus leading $DC_1$ and $DC_2$ being at the logic low state. In digital logic, this corresponds to configuration '00' as already described in FIG. 10.

Later, it can be seen that during $DISCHG_{POS}$ phase, $ERR_1$ is below $SIG_1$ thus leading $DC_1$ being at the logic high state and $ERR_2$ exceeds $SIG_1$ thus leading $DC_2$ being at the logic low state.

In digital logic, this corresponds to configuration '10' as already described in FIG. 10.

Later again, it can be seen that during $DISCHG_{NEG}$ phase, $ERR_1$ is below $SIG_1$ thus leading $DC_1$ being at the logic high state and $ERR_2$ is below $SIG_1$ thus leading $DC_2$ being at the logic high state.

In digital logic, this corresponds to configuration '11' as already described in FIG. 10.

Referring to FIG. 11, in the second clock cycle period, it can be seen that during the first CHG phase, both $ERR_1$ and $ERR_2$ exceed $SIG_1$ thus leading $DC_1$ and $DC_2$ being at the logic low state.

In digital logic, this corresponds to configuration '00' as already described in FIG. 10.

Later, it can be seen that during the second CHG phase, $ERR_2$ is below $SIG_1$ thus leading $DC_2$ being at the logic high state and $ERR_1$ exceeds $SIG_1$ thus leading $DC_1$ being at the logic low state.

In digital logic, this corresponds to configuration '01' as already described in FIG. 10.

Later again, it can be seen that during $DISCHG_{NEG}$ phase, $ERR_1$ is below $SIG_1$ thus leading $DC_1$ being at the logic high state and $ERR_2$ is below $SIG_1$ thus leading $DC_2$ being at the logic high state.

In digital logic, this corresponds to configuration '11' as already described in FIG. 10.

Referring to FIG. 12, in the first clock cycle period, it can be seen that during CHG phase, both $ERR_1$ and $ERR_2$ exceed $SIG_1$ thus leading $DC_1$ and $DC_2$ being at the logic low state.

In digital logic, this corresponds to configuration '00' as already described in FIG. 10.

Later, it can be seen that during $DISCHG_{POS}$ phase, $ERR_1$ is below $SIG_1$ thus leading $DC_1$ being at the logic high state and ERR2 exceeds $SIG_1$ thus leading $DC_2$ being at the logic low state.

In digital logic, this corresponds to configuration '10' as already described in FIG. 10.

Referring to FIG. 12, in the second clock cycle period, it can be seen that during the first CHG phase, both $ERR_1$ and $ERR_2$ exceed $SIG_1$ thus leading $DC_1$ and $DC_2$ being at the logic low state.

In digital logic, this corresponds to configuration '00' as already described in FIG. 10.

Later, it can be seen that during the second $DISCHG_{NEG}$ phase, both $ERR_1$ and $ERR_2$ are below $SIG_1$ thus leading $DC_1$ and $DC_2$ being at the logic high state.

In digital logic, this corresponds to configuration '11' as already described in FIG. 10.

Figure 13:
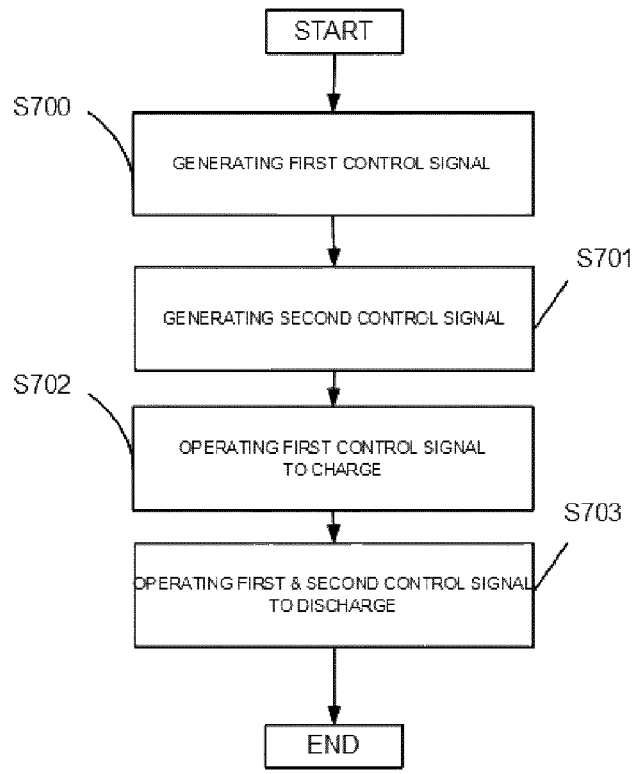
FIG. 13 is a flow diagram illustrating an embodiment of the proposed solution.

FIG. 13 is a flow diagram illustrating an embodiment of the proposed solution corresponding to the embodiment as already described above for FIG. 12.

Referring to FIG. 13, in step S700, a first control signal $DC_1$ based on, at least, the negative output voltage, a negative reference voltage and a saw-tooth signal is generated as already described above.

Then, in a step S701, a second control DC2 signal based on, at least, the positive output voltage, positive reference voltage and a saw-tooth signal is generated as already described above.

Later, in a step S702, the SIBOBB 1000 is operated, based on a given logic and the first control signal so as to initiate a charging phase CHG, such that a first duty cycle of the first control signal is controlling an amount of energy to be accumulated by the SIBOBB 1000 as already described above.

Finally, in a step S703, the SIBOBB 1000 is operated, based on the given logic and the first control signal simultaneously with the second control signal so as to initiate an independent discharging phase $DISCHG_{NEG}$, $DISCHG_{POS}$ of the accumulated energy, in a buck-type or boost-type, to at least an output of the SIBOBB 1000 such that a second duty cycle of the second control signal is controlling an amount of energy to be discharged by the SIBOBB 1000 as already described above.

After that, the algorithm would stop.

Figure 14:
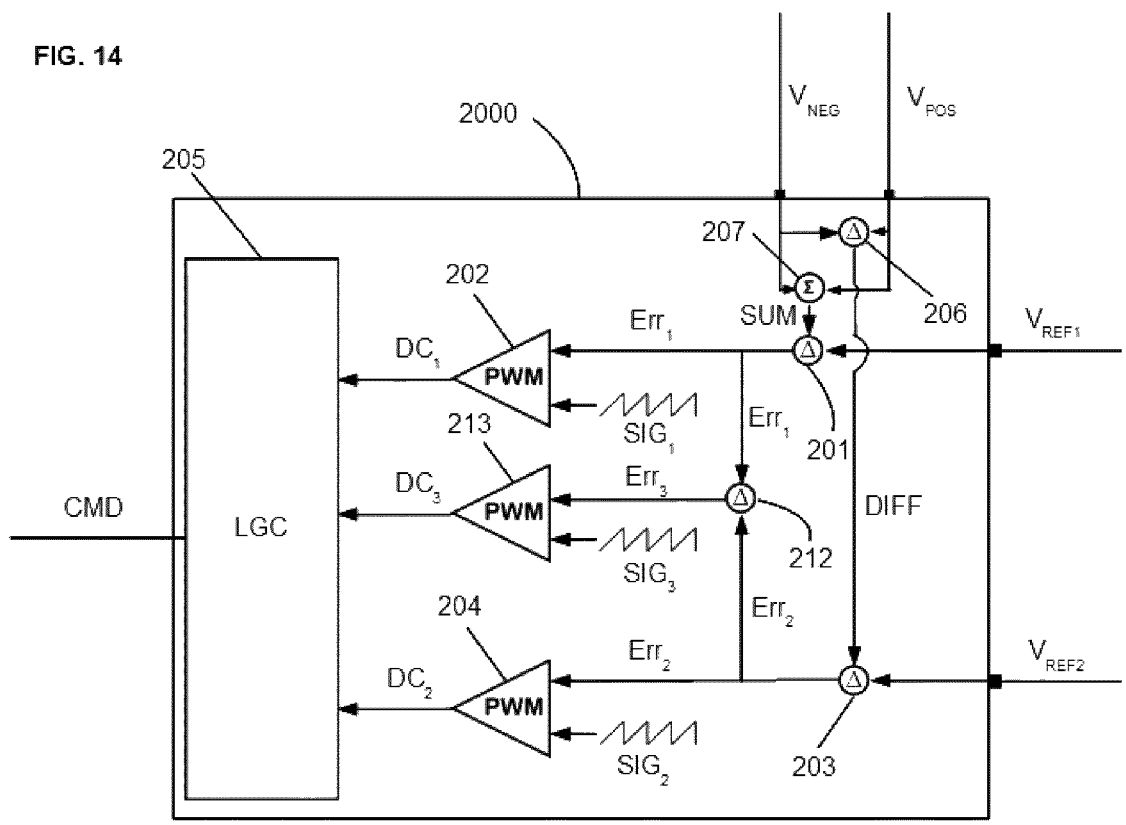
FIG. 14 is a block diagram illustrating yet another embodiment of a controller according to the proposed solution.

FIG. 14 is a block diagram illustrating an embodiment of CTRL 2000.

With the embodiment of FIG. 14, the average current passing through the inductor 106 and the ohmic losses are optimised.

In fact, for certain industry, such as the mobile phone industry, there are stringent requirements regarding the size of the components that could be used, in order to produce low cost and small physical size devices in order to suit customers needs.

This is the case, for instance, for the inductor 106 that is used in the SIBOBB 1000 if the latter need to be placed as close a possible to the mobile phone screen.

One should know that the height of an inductor is proportional to the load current, thus it could be said that higher inductors can handle more currents than smaller ones.

In the SIBOBB 1000 the amount of current passing through the inductor 106, at a given moment in time, can be determined by the following formula:

$$I_L = I_{OUT} \times V_{OUT}/V_{IN},$$

wherein $I_L$ is the amount of current in the inductor, $I_{OUT}$ is the amount of current at the output of the SIBOBB 1000, $V_{OUT}$ is the output voltage of the SIBOBB 1000 and $V_{IN}$ is the input voltage of the SIBOBB 1000 such as $V_{BAT}$.

Therefore, one should understand that as $V_{IN}$ is decreasing and $V_{OUT}$ is increasing, depending on the application, high peak currents (e.g. 2 Amps) could be experienced in the inductor 106, thus reaching the current saturation of the inductor 106.

This situation could occur with conduction cycles feeding outputs 109, 110, 111, 112 of the SIBOBB 1000 in a sequential fashion.

However, as said above, high peak currents would require inductors high in size (e.g. 2 mm) while, for instance in the mobile phone industry, inductors with smaller height (e.g. <1 mm) are required.

This is not acceptable and it should be possible to deliver independent buck-type or boost-type bipolar voltages in a SIBOBB 1000 using small sized inductors.

This optimisation could be achieved by discharging the inductor, at some point, through the bipolar outputs of the SIBOBB 1000 in a simultaneous fashion instead of doing it in a sequential fashion.

Namely, this optimisation involves the use of conduction cycles made of at least three phases.

The three phases can be chosen from a group comprising a charging phase CHG, the positive discharging phase $DISCHG_{POS}$, the negative discharging phase $DISCHG_{NEG}$ and the discharging phase $DISCHG_{SIMUL}$ as already described above.

However, as stated earlier, one should note that the first phase of the conduction cycle needs to be set to the charging phase CHG and also that it is assumed that $V_{POS}$ is substantially higher than the voltage $V_{BAT}$.

Therefore, in this embodiment of FIG. 14, at least four different configurations of the conduction cycle can be implemented, based on particular chaining of the different phases during a clock cycle period.

Namely, the conduction cycle can be arranged in any of the following configurations:

$CHG$-$DISCHG_{SIMUL}$-$DISCHG_{POS}$,
$CHG$-$DISCHG_{SIMUL}$-$DISCHG_{NEG}$,
$CHG$-$DISCHG_{POS}$-$DISCHG_{SIMUL}$, and
$CHG$-$DISCHG_{NEG}$-$DISCHG_{SIMUL}$.

For instance, conduction cycles "$CHG$-$DISCHG_{POS}$-$DISCHG_{SIMUL}$" or "$CHG$-$DISCHG_{SIMUL}$-$DISCHG_{POS}$" could be used to discharge more energy into the positive output 110, considering that it requires more energy than the negative output 109.

For instance, conduction cycle "$CHG$-$DISCHG_{NEG}$-$DISCHG_{SIMUL}$" or "$CHG$-$DISCHG_{SIMUL}$-$DISCHG_{NEG}$" could be used to discharge more energy into the negative output 109, considering that it requires more energy than the positive output 110.

Therefore, one should understand that discharging phase $DISCHG_{SIMUL}$ is to be performed simultaneously on both outputs.

Referring to FIG. 14, there is shown therein four difference units 201, 203, 206, 212, one summation unit 207, three error comparison units 202, 204, 213 and a logic control unit (LGC) 205.

Referring to FIG. 14, $V_{POS}$ and $V_{NEG}$ are received at the input of the difference unit 206 which is configured to generate a voltage DIFF from a difference between $V_{POS}$ and $V_{NEG}$.

Again in FIG. 14, $V_{POS}$ and $V_{NEG}$ are received at the input of the summation unit 207 which is configured to generate a voltage SUM from a sum of $V_{POS}$ and $V_{NEG}$.

Later in FIG. 14, SUM and $V_{REF1}$ are received at the input of the difference unit 201 which is configured to generate an error signal $ERR_1$ from a difference between SUM and $V_{REF1}$.

Also, in FIG. 14, DIFF and $V_{REF2}$ are received at the input of the difference unit 203 which is configured to generate an error signal $ERR_2$ from a difference between DIFF and $V_{REF2}$.

Later, $ERR_1$ and $ERR_2$ are received at the input of the difference unit 212 which is configured to generate an error signal $ERR_3$ from a difference between $ERR_1$ and $ERR_2$.

Subsequently, $ERR_1$ is presented at the input of the comparison unit 202 along with a signal $SIG_1$, $ERR_2$ is presented at the input of the comparison unit 204 along with a signal $SIG_2$ and $ERR_3$ is presented at the input of the comparison unit 213 along with a signal $SIG_3$.

One should understand that each of the implementation of comparison units 202, 204, 213 might be different from each other, each of the implementation of the difference units 201, 203, 206, 212 might be different from each other as well and each of the implementation of $SIG_1$, $SIG_2$, $SIG_3$ might be different from each other.

In an embodiment, the difference units 201, 203, 206, 212 are error amplifiers with proportional plus integral plus derivative (PID) control, the comparison units 202, 204, 213 are Pulse Width Modulation (PWM) generators while signal $SIG_1$, $SIG_2$, $SIG_3$ are a signal of a saw-tooth signal or a triangular signal.

With such embodiment, the comparison unit 202 is configured to generate a PWM signal $DC_1$ based on $ERR_1$ and $SIG_1$.

This operation is performed, for instance, by having the PWM modulator 202 setting a logic high state to $DC_1$ when $ERR_1$ is below $SIG_1$ and setting a logic low state to $DC_1$ when $ERR_1$ exceeds $SIG_1$.

Also, with such embodiment, the comparison unit 204 is configured to generate a PWM signal $DC_2$ based on $ERR_2$ and $SIG_2$.

This operation is performed, for instance, by having the PWM modulator 204 setting a logic high state to $DC_2$ when $ERR_2$ is below $SIG_2$ and setting a logic low state to $DC_2$ when $ERR_2$ exceeds $SIG_2$.

Again, with such embodiment, the comparison unit 213 is configured to generate a PWM signal $DC_3$ based on $ERR_1$ and $ERR_2$.

This operation is performed, for instance, by setting a logic high state to $DC_3$ when $ERR_3$ is below $SIG_3$ and setting a logic low state to $DC_3$ when $ERR_3$ exceeds $SIG_3$.

In digital logic, logic high state would be a bit 1 and logic low state would be a bit 0 while in analog logic, logic high state would be a high voltage level and logic low state would be a low voltage level.

Finally, $DC_1$, $DC_2$ and $DC_3$ are presented at the input of LGC 205 which is configured to generated the one or more control commands CMD used to drive DRV 3000 as already explained in the foregoing, in order to apply a given conduction cycle.

The choice of which configuration of the conduction cycle to be used depends on the different logic within which $DC_1$, $DC_2$ and $DC_3$ are, during the clock cycle period.

Additionally, since $DC_1$, $DC_2$ and $DC_3$ are based on the positive output voltage $V_{POS}$, and on the negative output voltage $V_{NEG}$, therefore the conduction cycle depends on the positive output voltage $V_{POS}$, and on the negative output voltage $V_{NEG}$.

More generally, in the present application, $DC_1$ is used, alone, by LGC 205 to determine the amount of energy to be accumulated by SIBOBB 1000.

On the other hand, $DC_1$, $DC_2$ and $DC_3$ are used all together by LGC 205 to determine the amount of energy to be discharged to each output of SIBOBB 1000.

This could be achieved by having $DC_2$ and $DC_3$ being symmetrical with respect to $DC_1$, thus creating the two additional phases of the conduction cycle.

In this case, at a given moment in time, $DC_2$ could be equal to $DC_1$ plus a given delta value while $DC_3$ would be equal to $DC_1$ minus the given delta value.

Another possibility is that, at a given moment in time, $DC_3$ could be equal to $DC_1$ plus a given delta value while $DC_2$ is equal to $DC_1$ minus the given delta value.

One should understand that the amount of energy to be accumulated or discharged, as explained in the foregoing embodiment of FIG. 14, depends on the duty cycle of the corresponding signals $DC_1$, $DC_2$ and $DC_3$ wherein the duty cycle should be understood as being the amount of time during which $DC_1$, $DC_2$ and $DC_3$ are in a logic high state, during the clock cycle period.

The proposed solution enables to optimise the amount of current that passes through the inductor 106 of the SIBOBB 1000, thus enabling the use of small sized conductors for implementation.

An apparatus embodying features of the proposed solution is also claimed.

A display integrated circuit comprising the apparatus is also claimed.

The latter may comprise also, for instance, a display panel, the SIBOBB 1000, a processor 4000.

A wireless device comprising the display integrated circuit is also claimed.

In the claims, the word "comprising" does not exclude other elements or steps, and the indefinite article "a" or "an" does not exclude a plurality. A single unit may fulfil the functions of several items recited in the claims.

For instance, reference voltages $V_{REF1}$, $V_{REF2}$ might be stored inside the processor PROC 4000 or outside within a memory such as a register.

For instance also, DRV 3000 might be implemented inside CTRL 2000.

In the foregoing description, power switches 101, 102, 103 and 104 are respectively substantially equivalent to the power switches 100, 20, 400 and 300.

As explained as well earlier, CTRL 2000 might be implemented with digital logic, analog logic or mixed-signal logic without departing from the scope of the proposed solution.

The mere fact that different features are recited in mutually different dependent claims does not indicate that a combination of these features cannot be advantageously used. Any reference signs in the claims should not be construed as limiting the scope of the proposed solution.

REFERENCE DOCUMENTS LIST

Document (1): TEXAS INSTRUMENTS, TPS65136. Single Inductor Multiple Output Regulator for AMOLED. http://www.ti.com/lit/ds/symlink/tps65136.pdf (849 KB). 7 Jul. 2008.

Document (2): WO2012/032176.

The invention claimed is:

1. A method of driving a Single Inductor Bipolar Output Buck-Boost, SIBOBB, clocked by a clock signal having a given clock cycle period, the SIBOBB having an input for receiving a first potential, first, second, third, and fourth power switches, at least one positive output outputting a positive output voltage substantially higher than the first potential, and at least one negative output outputting a negative output voltage, the method comprising during the given clock cycle period:

generating a first control signal based on, at least, the positive output voltage and a positive reference voltage;

generating a second control signal based on, at least, the negative output voltage and a negative reference voltage;

initiating a charging phase of charging the SIBOBB based on the first control signal, wherein a first amount of energy to be accumulated by the SIBOBB during the charging phase controlled by a first duty cycle of the first control signal, wherein the first switch is connected between the input and a first terminal of an inductor, the second switch is connected between the first terminal of the inductor and a first terminal of a first capacitor, a second terminal of the first capacitor is connected to a reference potential, the third switch is connected between a first terminal of a second capacitor and a second terminal of the inductor, a second terminal of the second capacitor is connected to the reference potential, and the fourth switch is connected between the reference potential and the second terminal of the inductor, during the charging phase the first and fourth switches are closed and the second and third switches are open and current flows from the input and through the first switch, the inductor, and the fourth switch; and initiating a first phase of discharging a second amount of energy accumulated in the SIBOBB to the at least one of the positive output in a boost-type configuration of the SIBOBB and the negative output in a buck-type or boost-type configuration of the SIBOBB based on the first control signal and the second control signal, wherein the second amount of energy discharged by the SIBOBB being controlled by a second duty cycle of the second control signal, wherein the discharging phase comprises at least two of a positive discharging phase, a negative discharging phase, and a simultaneous discharging phase, during the positive discharging phase the first and third switches are closed and the second and fourth switches are open and current flows from the input through the first switch, the inductor, the third switch, and the second capacitor, during the negative discharging phase the first and third switches are open and the second and fourth switches are closed and current flows from the first capacitor through the second switch, the inductor, and the fourth switch, and during the simultaneous discharging phase the first and fourth switches are open and the second and third switches are closed, wherein the charging phase is initiated before the discharging phase.

2. The method of claim 1, wherein
the first switch includes first and second transistors, the second switch includes third and fourth transistors, the third switch comprises a fifth transistor, and the fourth switch comprises a sixth transistor, a first difference between a first control voltage and a second control voltage is greater than both a first threshold voltage of the first transistor and the second threshold voltage of a second transistor when the first switch is closed, a second difference between a third control voltage and a fourth control voltage is greater than both a third threshold voltage of the third transistor and a fourth threshold voltage of the fourth transistor when the second switch is closed, a third difference between a second potential and the reference potential is greater than a fourth threshold voltage, and a fourth difference between a third potential and the reference potential is less than the third threshold voltage, the first switch is controlled by a potential received on a first control input of the first transistor and a potential received on a second control input of the second transistor, in a manner that controls conversion of the first potential into the second potential and into the third potential, the second switch is controlled by a potential received on a third control input of the third transistor and a potential received on a fourth control input of the fourth transistor, in a manner that controls conversion of the first potential into the second potential and into the third potential, the third switch is controlled by a potential received on a fifth control input of a fifth transistor, in a manner that controls conversion of the first potential into the second potential and into the third potential, the fourth switch being controlled by a potential received on a sixth control input of the sixth transistor, in a manner that controls conversion of the first potential into the second potential and into the third potential, the reference potential is applied to the first control input of the first transistor of the first switch and/or the reference potential is applied to the third control input of the third transistor of the second switch.

3. The method of claim 1, wherein the generating of the first control signal is further based on the negative output voltage, and the generating of the second control signal is further based on the positive output voltage.

4. The method of claim 1, wherein the discharging phase comprises performing the positive discharge phase followed by the negative discharge phase.

5. The method of claim 1, wherein the discharging phase comprises performing the negative discharge phase followed by the positive discharge phase.

6. The method of claim 1, wherein the simultaneous discharging phase simultaneously discharges accumulated energy to the positive output in a boost-type configuration of the SIBOBB and to the negative output in a buck-type or boost-type configuration of the SIBOBB.

7. The method of claim 6, wherein the second simultaneous discharging phase is performed before the positive or negative discharging phase.

8. The method of claim 6, the simultaneous discharging phase is performed after the positive or negative discharging phase.

9. The method of claim 1, wherein the first and second control signals are generated by a Pulse Width Modulation, PWM, modulator based on respective comparison signals, wherein at least some of the comparison signals are sawtooth signals or triangular signals.

10. The method of claim 9, wherein the generating of the first control signal is performed by inputting into the PWM modulator, a first comparison signal among the comparison signals and a first error signal proportional to a voltage difference between the positive output voltage and the positive reference voltage.

11. The method of claim 9, wherein the generating of the second control signal is performed by inputting into the PWM modulator, a second comparison signal among the comparison signals and a second error signal proportional to a voltage difference between the negative output voltage and the negative reference voltage.

12. The method of claim 9, wherein the generating of the first control signal is performed by inputting into the PWM modulator, a first comparison signal among the comparison signals and a first error signal corresponding to a voltage difference between a sum reference voltage and a voltage sum of positive output voltage and negative output voltage.

13. The method of claim 9, wherein the generating of the second control signal is performed by inputting into the PWM modulator, a second comparison signal among the comparison signals and a second error signal corresponding to a voltage difference between a difference reference voltage and a voltage difference between the positive output voltage and the negative output voltage.

14. An apparatus for driving a Single Inductor Bipolar Output Buck-Boost, SIBOBB, the apparatus comprising:
an input for receiving a first potential;
at least one positive output configured to output a positive output voltage substantially higher than a first potential;
at least one negative output configured to output a negative output voltage;
an inductor;
first and second capacitors;
a first switch connected between the input and a first terminal of the inductor;
a second switch connected between the first terminal of the inductor and a first terminal of the first capacitor, wherein a second terminal of the first capacitor is connected to a reference potential;
a third switch connected between a first terminal of the second capacitor and a second terminal of the inductor, wherein a second terminal of the second capacitor is connected to the reference potential;
a fourth switch is connected between the reference potential and the second terminal of the inductor
a first pulse width modulation, PWM, modulator configured to generate a first control signal based on, at least, the negative output voltage and a negative reference voltage;
a second PWM modulator configured to generate a second control signal based on, at least, the positive output voltage and a positive reference voltage;
a driver configured to initiate a charging phase of the SIBOBB, based on a monitoring of the first control signal, wherein a first amount of energy accumulated by the SIBOBB is controlled by a first duty cycle of the first control signal, wherein during the charging phase the first and fourth switches are closed and the second and third switches are open and current flows from the input and through the first switch, the inductor, and the fourth switch,
wherein the driver is further configured to initiate a discharging phase of discharging a second amount energy accumulated in the SIBOBB to at least one of the positive output in a boost-type configuration of the SIBOBB and the negative output in a buck-type or boost-type configuration of the SIBOBB based on the first control signal and the second control signal, wherein the second amount of energy discharged by the SIBOBB is controlled by a second duty cycle of the second control signal, wherein the discharging phase comprises at least two of a positive discharging phase, a negative discharging phase, and a simultaneous discharging phase, during the positive discharging phase the first and third switches are closed and the second and fourth switches are open and current flows from the input through the first switch, the inductor, the third switch, and the second capacitor, during the negative discharging phase the first and third switches are open and the second and fourth switches are closed and current flows from the first capacitor through the second switch, the inductor, and the fourth switch, and during the simultaneous discharging phase the first and fourth switches are open and the second and third switches are closed wherein the charging phase is initiated before initiating the discharging phase.

15. The apparatus of claim 14, wherein the first switch includes first and second transistors, the second switch includes third and fourth transistors, the third switch comprises a fifth transistor, and the fourth switch comprises a sixth transistor, a first difference between a first control voltage and a second control voltage is greater than both a first threshold voltage of the first transistor and the second threshold voltage of a second transistor when the first switch is closed, a second difference between a third control voltage and a fourth control voltage is greater than both a third threshold voltage of the third transistor and a fourth threshold voltage of the fourth transistor when the second switch is closed, a third difference between a second potential and the reference potential is greater than a fourth threshold voltage, and a fourth difference between a third potential and the reference potential is less than the third threshold voltage, the first switch is controlled by a potential received on a first control input of the first transistor and a potential received on a second control input of the second transistor, in a manner that controls conversion of the first potential into the second potential and into the third potential, the second switch is controlled by a potential received on a third control input of the third transistor and a potential received on a fourth control input of a fourth transistor, in a manner that controls conversion of the first potential into the second potential and into the third potential, the third switch is controlled by a potential received on a fifth control input of a fifth transistor, in a manner that controls conversion of the first potential into the second potential and into the third potential, the fourth switch is controlled by a potential received on a sixth control input of the sixth transistor, in a manner that controls conversion of the first potential into the second potential and into the third potential, the reference potential is applied to the first control input of the first switch and/or the reference potential is applied to the third control input of the third transistor of the second switch.

16. The apparatus of claim 14, wherein the means for generating the first control signal operate also based on the positive output voltage and the means for generating the second control signal operate also based on the negative output voltage.

17. The apparatus of claim 14, wherein the first discharging phase comprises performing the positive discharge phase followed by the negative discharge phase.

18. The apparatus of claim 14, wherein the first discharging phase comprises performing the negative discharge phase followed by the positive discharge phase.

19. The apparatus of claim 14, wherein the simultaneous discharging phase simultaneously discharged accumulated energy to the positive output in a boost-type configuration of the SIBOBB and to the negative output in a buck-type or boost-type configuration of the SIBOBB.

20. The apparatus of claim 19, wherein the simultaneous discharging phase is performed before the positive or negative discharging phase.

21. The apparatus of claim 19, wherein the simultaneous discharging phase is performed after the positive or negative discharging phase.

22. A display integrated circuit comprising:
a display panel;
Single Inductor Bipolar Output Buck-Boost converter, SIBOBB;
a processor; and,
an apparatus as defined in claim 14, wherein the display panel and the apparatus are controlled by the processor, the display panel is powered by the SIBOBB and the SIBOBB is controlled by the apparatus.

* * * * *